United States Patent [19]
Gechter

[11] Patent Number: 5,498,003
[45] Date of Patent: Mar. 12, 1996

[54] INTERACTIVE ELECTRONIC GAMES AND SCREEN SAVERS WITH MULTIPLE CHARACTERS

[76] Inventor: Jerry Gechter, Eight Ridge Rd., Lincoln, Mass. 01773

[21] Appl. No.: 168,667

[22] Filed: Dec. 16, 1993

Related U.S. Application Data

[63] Continuation-in-part of Ser. No. 133,644, Oct. 7, 1993.
[51] Int. Cl.⁶ ........................................ A63F 9/22
[52] U.S. Cl. ........................................ 273/434; 273/437
[58] Field of Search ........................................ 273/433, 434, 273/435, 437, 438, 85 G, DIG. 28, 460

[56] References Cited

U.S. PATENT DOCUMENTS

| | | |
|---|---|---|
| 4,738,451 | 4/1988 | Logg . |
| 4,856,787 | 8/1989 | Itkis . |
| 4,858,930 | 8/1989 | Sato . |
| 4,926,327 | 5/1993 | Sidley . |
| 5,083,271 | 1/1992 | Thacher . |
| 5,083,800 | 1/1992 | Lockton . |
| 5,120,057 | 6/1992 | Kitaue . |
| 5,137,277 | 8/1992 | Kitaue . |
| 5,190,285 | 3/1993 | Levy . |
| 5,193,818 | 3/1993 | Leeson . |
| 5,200,890 | 4/1993 | Pionchon . |
| 5,239,463 | 8/1993 | Blair . |
| 5,377,997 | 1/1995 | Wilden et al. ............ 273/434 |

FOREIGN PATENT DOCUMENTS

| | | | |
|---|---|---|---|
| 2163929 | 3/1986 | United Kingdom | 273/85 G |

OTHER PUBLICATIONS

King's Quest V product operation instructions.
Oregon Trail product operating instructions.
John Madden Football product operating instructions.
Description of Nintendo games from Nintendo Games from DeMaria, Rusel, "Nintendo Games Secrets" (Prima Publishing, Rocklin, Calif. 1990) pp. 1–9.
Elephant Clock product description in *CompuServe*, Oct. 1993, p. 11.
SimCity for Windows User Manuscript.
SimAnt product operating instructions.
After Dark product operating instructions.
Description of SimCity terrain editor and add–on graphics from SimCity Stretegies and Secrets by Nick Dargahi.
Microsoft Flight Simulator Aircraft and Scenary Designer User's Guide.
Berkeley Systems Disney Screen Saver Collection.
Microsoft Flight Simulator Version 5: operating instructions for dual-player flight.
Summary of modem games in *CompuServe*, Feb., 1994, pp. 46–48.

*Primary Examiner*—Jessica J. Harrison
*Attorney, Agent, or Firm*—Fish & Richardson

[57] ABSTRACT

Interactive, electronic game apparatus including a visual display, an input device, a plurality of character behavior controllers containing logic for determining the behavior of respective game characters, and a game controller containing logic to determine consistent game states for the game and the characters, each character behavior controller including an independent application process.

36 Claims, 14 Drawing Sheets

Action Messages

Fig. 10A

Character Behavior Controller → Game Controller

- Change in position or motion
- Change in object state
- Interactions initiated with other characters
  (object id, interaction type)
- Interactions initiated with Game Control
  (e.g. spawn, delete character)

Fig. 10B

Game Controller → Character Behavior Controller

- Interaction result
- New position or motion (from resolved interaction)
- New object state (from resolved interaction)

Fig. 10

Example Game--Global State Data

Example Game--Initialization Sequence
Fig. 12A
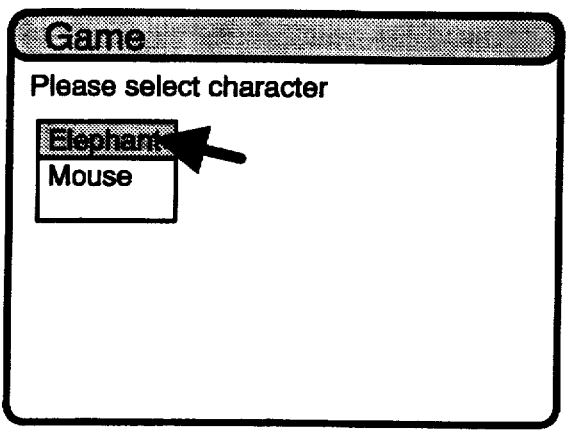
Fig. 12B
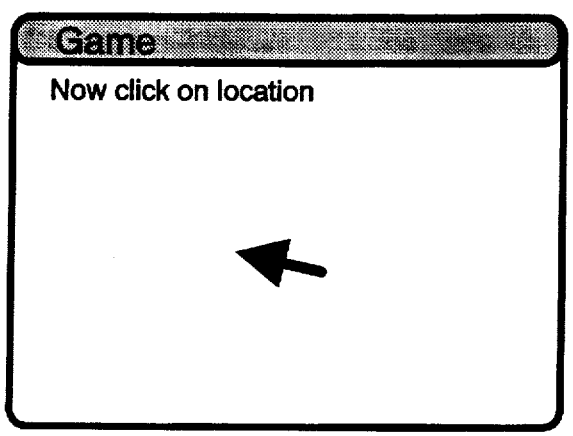
Fig. 12C
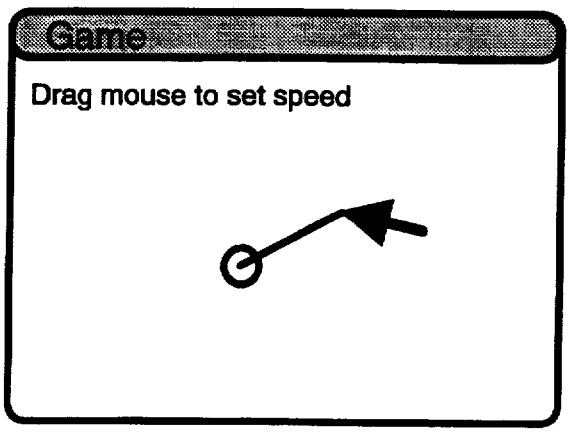
Fig. 12D
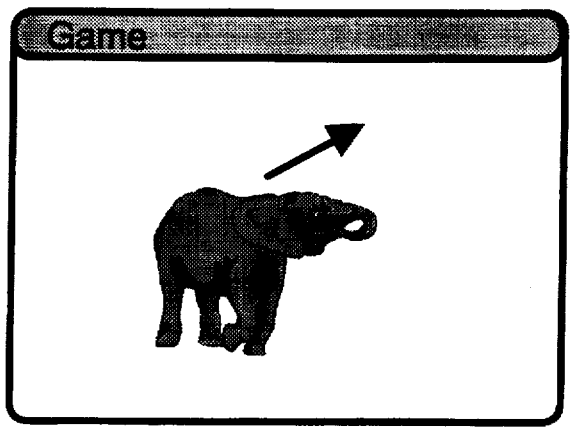
Fig. 12

Example Game--Interaction Sequence
Fig. 13A
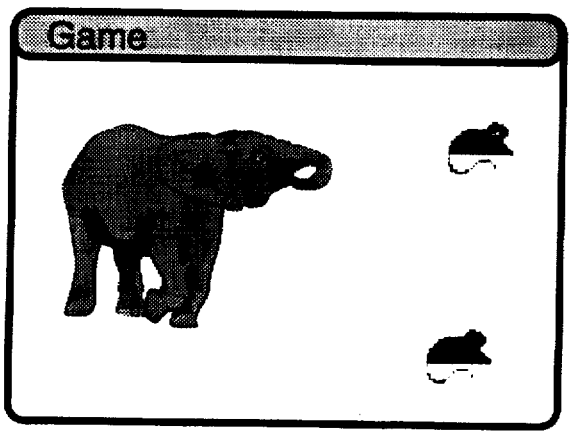
Fig. 13B
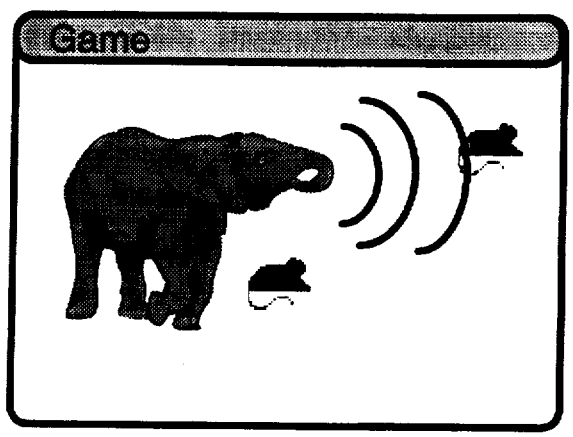
Fig. 13C
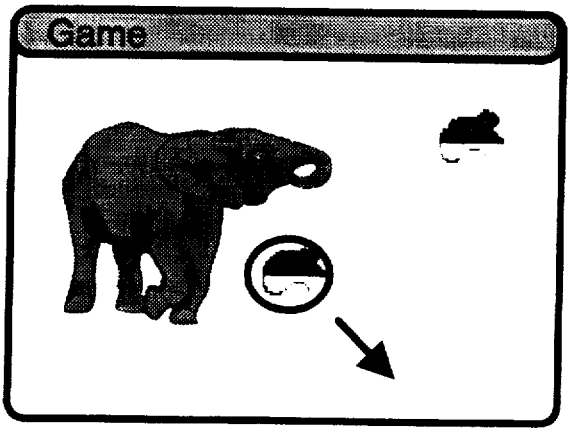
Fig. 13D
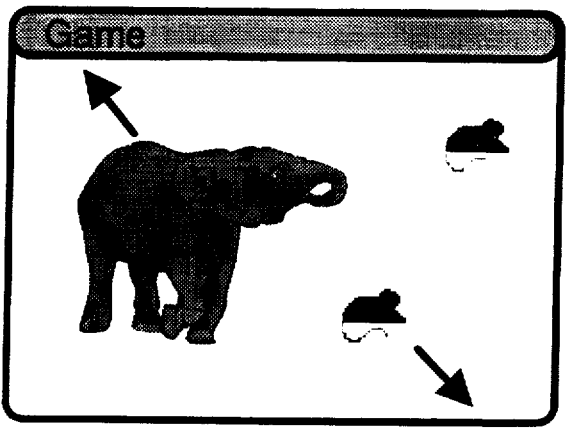
Fig. 13

Communications Options

Action Messages

- Dynamic Data Exchange
- Windows messages
- Include in Global State Data (game control -> character)
- Other operating system specific inter-process messaging
- Shared memory objects as message queues

Global State Data

- Memory file object
- Other forms of shared memory
- Game control to character object messaging
- Could include time synchronization

Process Synchronization

- Specific to operating system

Fig. 14

INTERACTIVE ELECTRONIC GAMES AND SCREEN SAVERS WITH MULTIPLE CHARACTERS

This application is a continuation in part of U.S. patent application Ser. No. 08/133,644, filed Oct. 7, 1993, which is hereby incorporated by reference.

BACKGROUND OF THE INVENTION

This invention relates to interactive computer and video games and to screen savers.

In interactive computer and video games, the user employs various input devices to control animated characters on a video screen, to influence their behavior, and to attempt to achieve the objectives posed by the game. There are many examples and forms of such games, which are distributed either as software permitting playing of the game on a personal computer or as combined software/hardware video game devices. These include arcade and Nintendo-style games, combat and flight simulation games, adventure games, sports strategy games, and others.

The characters in these games are specified at the time the game is developed. A single application program is used to define each game, which can include the option for playing the game with single or multiple characters controlled by one or more users. Some games allow new visual elements or game scenarios to be added to a preexisting game. This is the case with SimCity (which adds new cities and graphics) or with Microsoft Flight Simulator (which adds new airplanes and terrains). These additions are implemented by adding new data that are then acted upon by the preexisting program logic of the game.

In a somewhat related area, some screen savers, which provide a changing display for an inactive computer screen, permit user interaction to select combinations of display items to be presented whenever the screen saver is invoked.

SUMMARY OF THE INVENTION

This invention features a computer or video game in which new characters can be added to the game and still participate fully in interactions with prior characters and with the game environment. This is achieved by providing independent control logic for each character in the form of a character behavior controller. A game controller coordinates the various character behavior controllers, mediates their actions, and assures that the resulting visual display appears consistent to the game user. The invention drastically alters the relation that computer and video games can have with their users. Instead of merely following preset rules of a game, a user can employ the game as a framework to assemble his or her own fictional world. New characters can vary enormously in their appearance, patterns of behavior, and user control modes, so long as they subscribe to the paradigms established for interaction with the other entities in the game. These characters may be highly interactive, or merely configurable as in a screen saver display.

The invention allows computer games to assume characteristics that have until now been restricted to other kinds of toys. Play sets and construction toys, such as Playmobile and Lego, have always been extensible, and various kinds of dolls (particularly based upon movies and television programs) have been offered as an expanding family of related toys. This is a particularly appealing paradigm for computer games, because the characters can actually move, interact, and evolve following the behavioral logic embodied by the characters and the modes of interaction set by the game. Multiple instances of the same character can easily be created, and the same characters can be used with different game controllers.

A character can be a person or animal with its own behavioral characteristics: it knows how to move, how to change its appearance, and how to react to other characters in the same game. A character can also be an inanimate object that changes state and participates in interactions, e.g., thrown balls, walls placed as barriers, etc. A character can even be an active background, i.e., a screen area (e.g. falling rain) that changes state based upon game conditions and influences other characters accordingly. Any type of character can be added independently according to the capabilities of this invention.

Preferably the game controller executes four basic game control functions:

1. Providing the user interface to play the game. This provides the user the ability to set up and manage the game as a whole, as well as an ability to interact as necessary with the individual applications that control the characters.
2. Managing the creation and deletion of character instances. Creation and deletion may be caused either through the user interface (as during the initial setup of the game) or by interactions of characters during the game.
3. Resolving the interactions of the characters (e.g. collisions, battles, etc.).
4. Maintaining a consistent global state for the game. This also includes disseminating the global state to all of the characters and to the user interface entity of the game controller.

For each particular game, the interactions of the characters with the game control are reflected in the specifics of the interfaces between them, as described below.

This invention has an additional aspect in which an application process (the "operating application") takes over the role of the operating system, and the character behavior controllers and/or the game controller are embodied as separately loadable procedures for that application. With this aspect, new character behavior controllers and new game controllers can be incorporated into a single game application process.

In the preferred embodiment of this aspect, the game controller and the character behavior controllers are embodied as procedures in dynamic link libraries. A new game controller or character behavior controller is added by loading its DLL and invoking its procedures in the operating application. A game controller or character behavior controller can be replaced by substituting another DLL with new logic. It should be noted that the program logic for the operating application must include a reference to a DLL procedure in order for that procedure to be invoked for the game.

DESCRIPTION OF THE PREFERRED EMBODIMENT

Drawings FIG. 1 is a block diagram showing elements of an interactive electronic game according to the invention.

FIG. 10 is a diagram illustrating the communication between the game controller and the character behavior controllers during the game.

FIG. 11 is a table showing the global state data for an example implementation of the invention.

FIGS. 12A–12D are screen displays showing the sequence of screens for initialization of characters in the example implementation.

FIGS. 13A–13D are screen displays showing the sequence of screens for interaction of characters in the example implementation.

FIG. 14 shows implementation options for communication between the game controller and the character behavior controllers.

Structure

Figure 1:
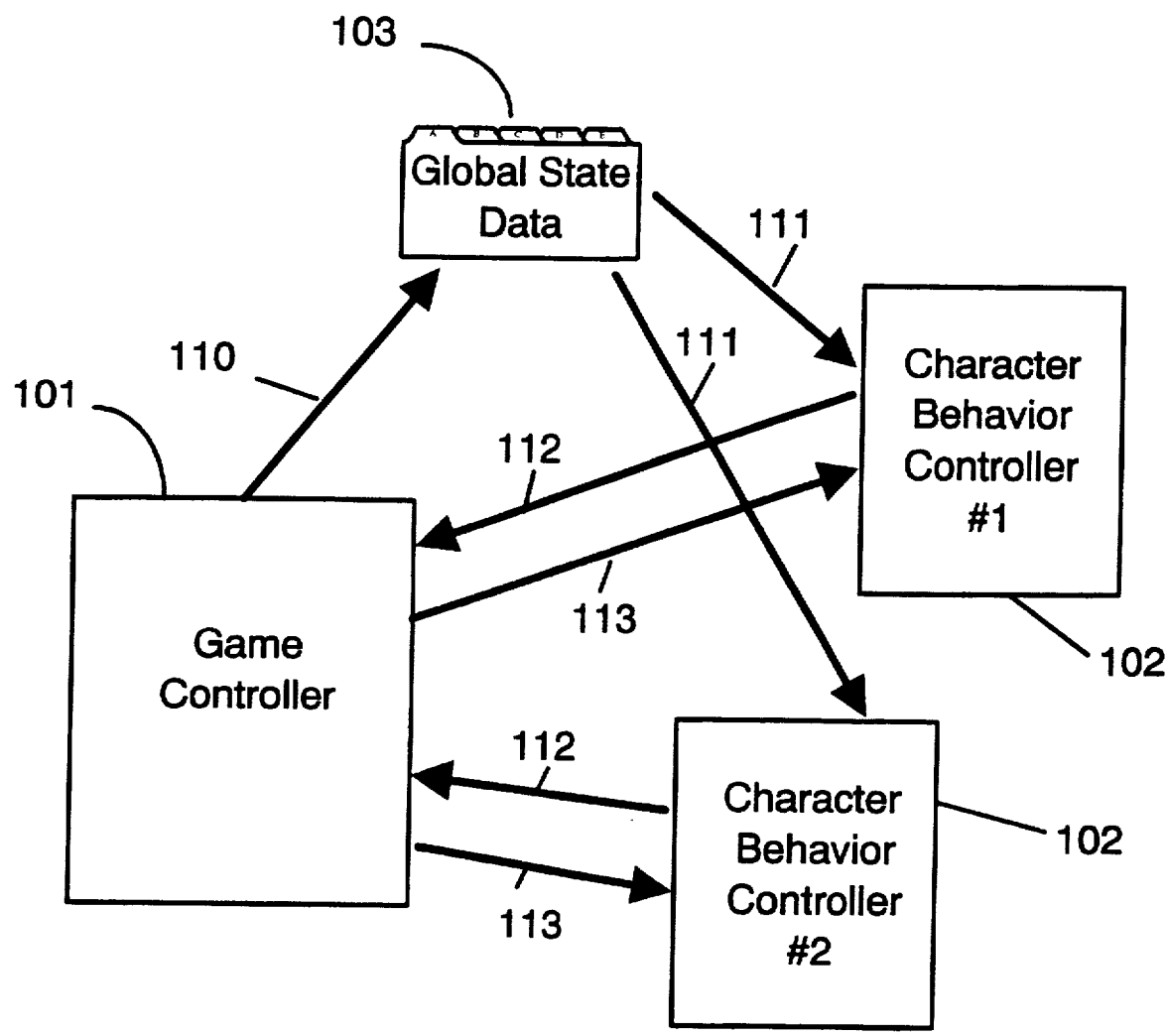
Figure 2:
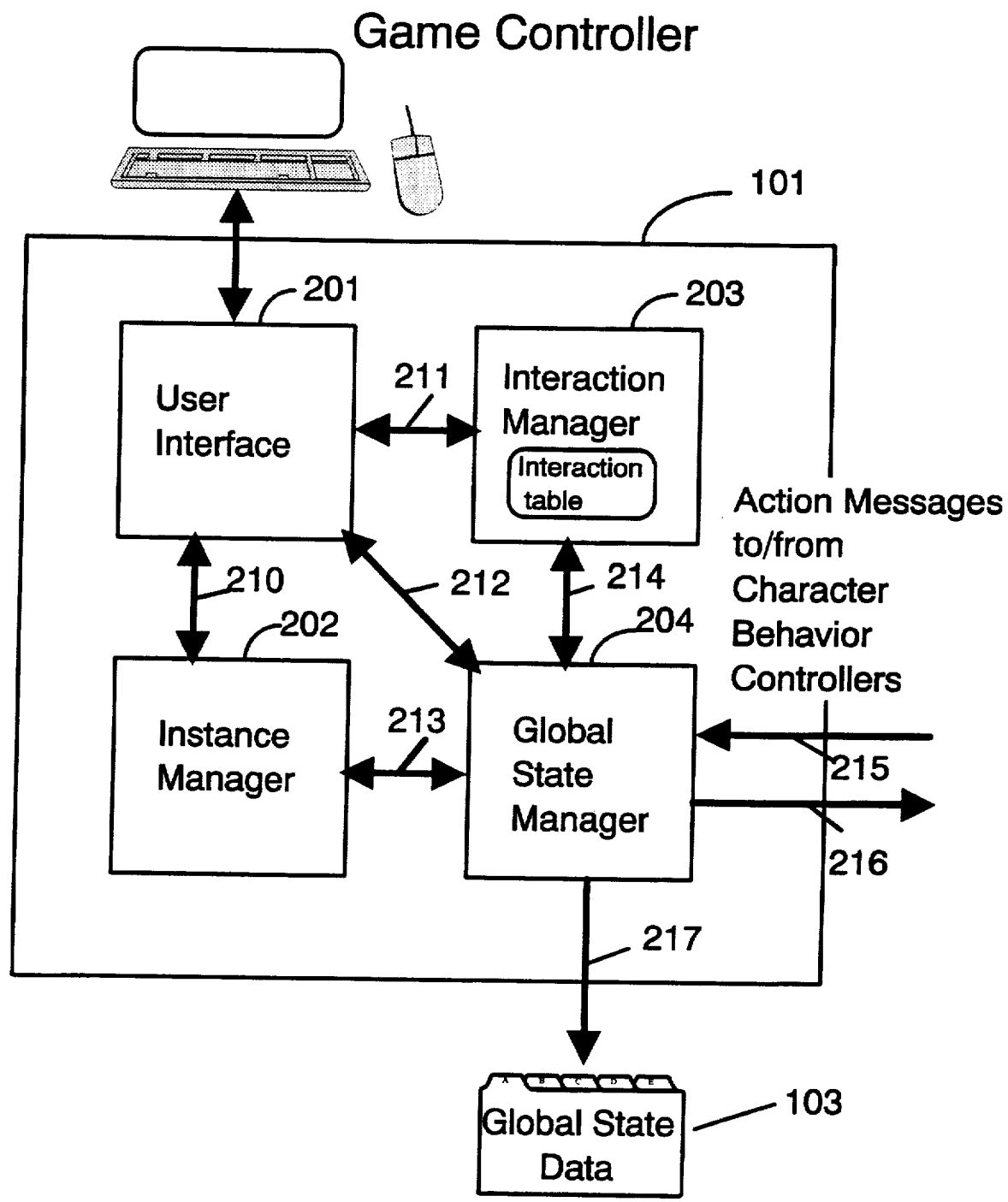
FIG. 2 is a block diagram showing the components of the game controller of the FIG. 1 game.

Referring to FIGS. 1 and 2, an electronic interactive game according to the invention employs the components shown on FIGS. 1 and 2. These figures show a single game controller 101 and two character behavior controllers 102, with interactions indicated by arrows 110/111 and 112/113. Game controller 101 and character behavior controllers 102 are implemented as independent processes on a computer system having a visual display, a user interaction device (e.g. a keyboard and mouse), and a central processing unit and operating system.

The electronic game according to the invention achieves its objective of extensibility by allowing multiple characters controlled by multiple character behavior controllers 102 to participate in the game. These character behavior controllers 102 are independently executing programs, i.e. independent processes as defined by the operating system. For Windows 3.1 and Windows NT, independent processes have separate entries in the Task List display; for Unix they are separately listed by the ps command (with —e flag). For Unix and Windows NT, independent processes also have independent address spaces (see Maurice J. Bach, The Design of the Unix Operating System, p. 10 and Helen Custer, Inside Windows NT, p. 84).

Character behavior controllers 102 provide the independent behavioral logic for the characters, whereas game controller 101 coordinates the activities of the characters. Game controller 101 interacts with the character behavior controllers 102 through global state data 103 or through direct interactions 110/111 and 112/113.

The first kind of interaction is through the global state data 103. As shown by arrow 110, the global state data are written by the game controller 101. From there, information is extracted by the individual character behavior controllers (arrows 111) as a basis for their behavior. In the preferred embodiment, the global state data are represented as a shared-memory object that can be accessed by each of the character behavior controllers. Each character behavior controller can thus independently check the contents of the global state data to know the externally-observable state information about all other objects in the game. Further in the preferred embodiment, the game controller assigns a character type identifier to each character behavior controller, so that it can recognize its own characters in the global state data. The content of the global state data is described in FIG. 9 and discussed in detail below.

The other kind of interaction with the character behavior controllers is via action messages (arrows 112–113). Action messages from the character behavior controllers to the game controller (arrows 112) communicate changes in character states and motions, and initiate interactions with other characters. Action messages from the game controller to the character behavior controllers (arrows 113) cause the characters to change state or motion (including possibly to enter a pause state awaiting resolution of interactions) and present interaction results. The role of game controller 101 is to maintain a consistent global state for the game by resolving all inputs (e.g. arrows 112), updating the global state data 103 (arrow 110), and communicating with each of the character behavior controllers 102 to force state changes where necessary (arrows 113).

FIG. 2 shows how this is done. This figure gives the internal structure of game controller 101. There are four components reflecting four functions of game controller 101: the user interface 201, the instance manager 202, the interaction manager 203, and the global state manager 204.

The user interface 201 manages the interactions of the game as a whole with the user and provides a mechanism to pass user control actions for individual characters. Game-level interactions start and stop the game, introduce new characters, and change overall game characteristics (e.g. speed). In this function the user interface interacts with all of the other game controller components: initiates and reflects instance creation (arrow 210), it modifies and reflects the global state (arrow 212), and it may initiate or provide for resolution of character interactions (arrow 211).

Figure 3:
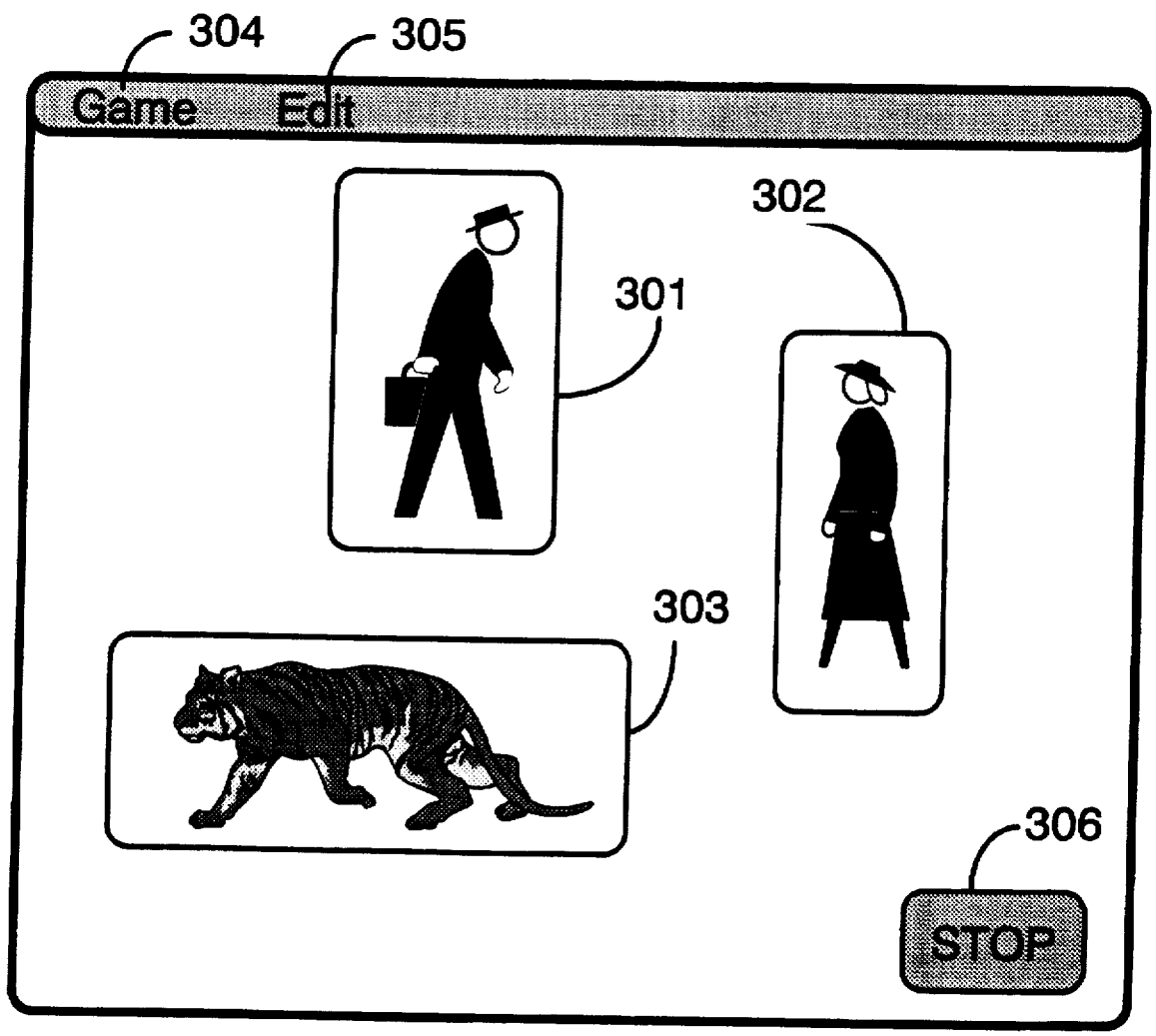
FIG. 3 is an example of a screen display of the FIG. 1 game illustrating the user interface to the game controller.

User control of individual characters is achieved either by direct interaction with the character behavior controllers or by messaging between the game controller and the character behavior controller. The result, as seen by the user, is shown in FIG. 3. The user is presented with multiple characters images 301–303 on the screen. In the preferred embodiment, the user will click on characters and then use mouse and keyboard actions to control an individual character according to that character's character behavior controller logic. This is achieved, for example, by allowing the selected character behavior controller to present a pop-up window which offers control options to the user. (Other methods for user control of characters are described in the example game implementation presented below.) Game controller actions may be performed by the screen menus 304, 305 or by user interaction with other game-control objects 306 on the user screen.

Returning to FIG.2, the instance manager 202 manages the creation and deletion of instances of characters through interaction with the appropriate character behavior controllers. At creation, each character instance is assigned a unique identifier which is communicated to the character behavior controller, so that it can recognize that character in the global state data. Instances of characters may be created at start-up as well as in the course of the game. For example, instances of game characters may be created or destroyed as a result of interactions between characters (e.g. a collision may cause an object to be destroyed) or as a result of decision logic in an individual character (e.g. a character may spontaneously replicate itself). Consequently, as noted above, the instance manager has a two-way interaction the user interface (arrow 210). It also provides output to the global state manager and receives instance management input as a result of global state resolution (arrow 213). Depending upon the specifics of particular games, the instance manager may also initiate and terminate execution of character behavior controllers as they are or are not required for control of active characters. Also, one instance of a character behavior controller may manage multiple character instances, or additional instances of the character behavior controller may be created.

Figure 4:
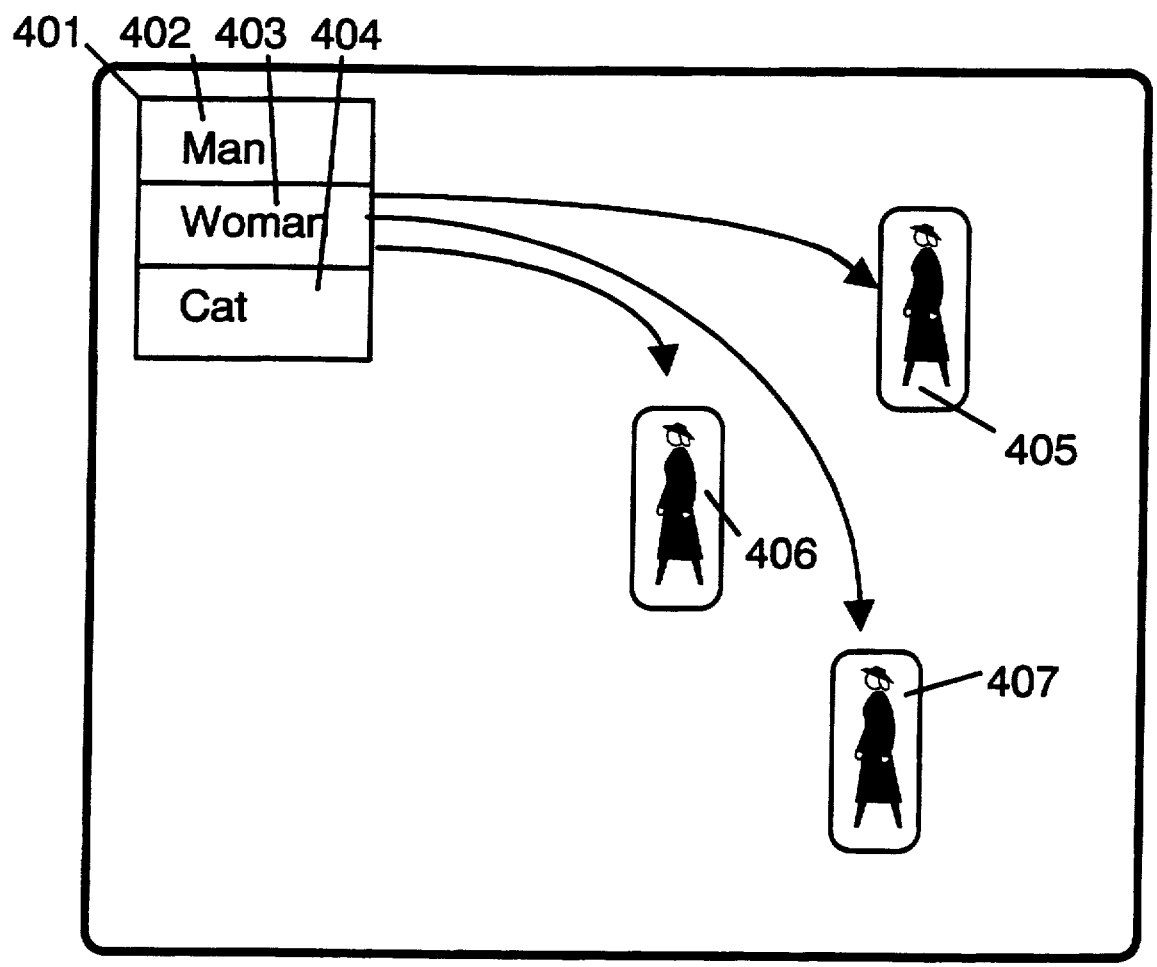
FIG. 4 is an example of a screen display of the FIG. 1 game illustrating the instance manager of the game controller during the start-up of the game and indicates how the user can invoke multiple instances of the characters.

FIG. 4 shows an example of how the services of the instance manager could be used at the start of a game. At the upper left of the screen is a selection box 401 showing the names of character types available to the user. The user clicks on an character type name and then clicks on another location on the screen. In response, the instance manager causes a character instance for the appropriate character behavior controller to be associated with a display object in that location. The figure shows three different character instances 405–407 of the character type represented by name 403. The individual character instances can then evolve according to the logic of the character behavior controller for that character type.

Again returning to FIG. 2, the interaction manager 203 resolves all character conflicts as needed to maintain a consistent global state for the game. Interactions may be initiated by individual characters (as an action message—arrow 215) or by the global state manager in the course of attempting to maintain global state. For example, characters may touch, speak to, or attack other characters, causing character-to-character interactions to be passed by the global state manager (arrow 214) to the interaction manager 203. A character behavior controller may also request the creation of another instance of a character, or may simply request a change of state which causes an inconsistency trapped by the global state manager. The logic of the interaction manager may use specific interaction-control data (described as an interaction table) and well as any other game controller data to resolve interactions for consistent global state. Execution of the outcome of an interaction is handled through the global state manager (arrow 214).

Figure 5:
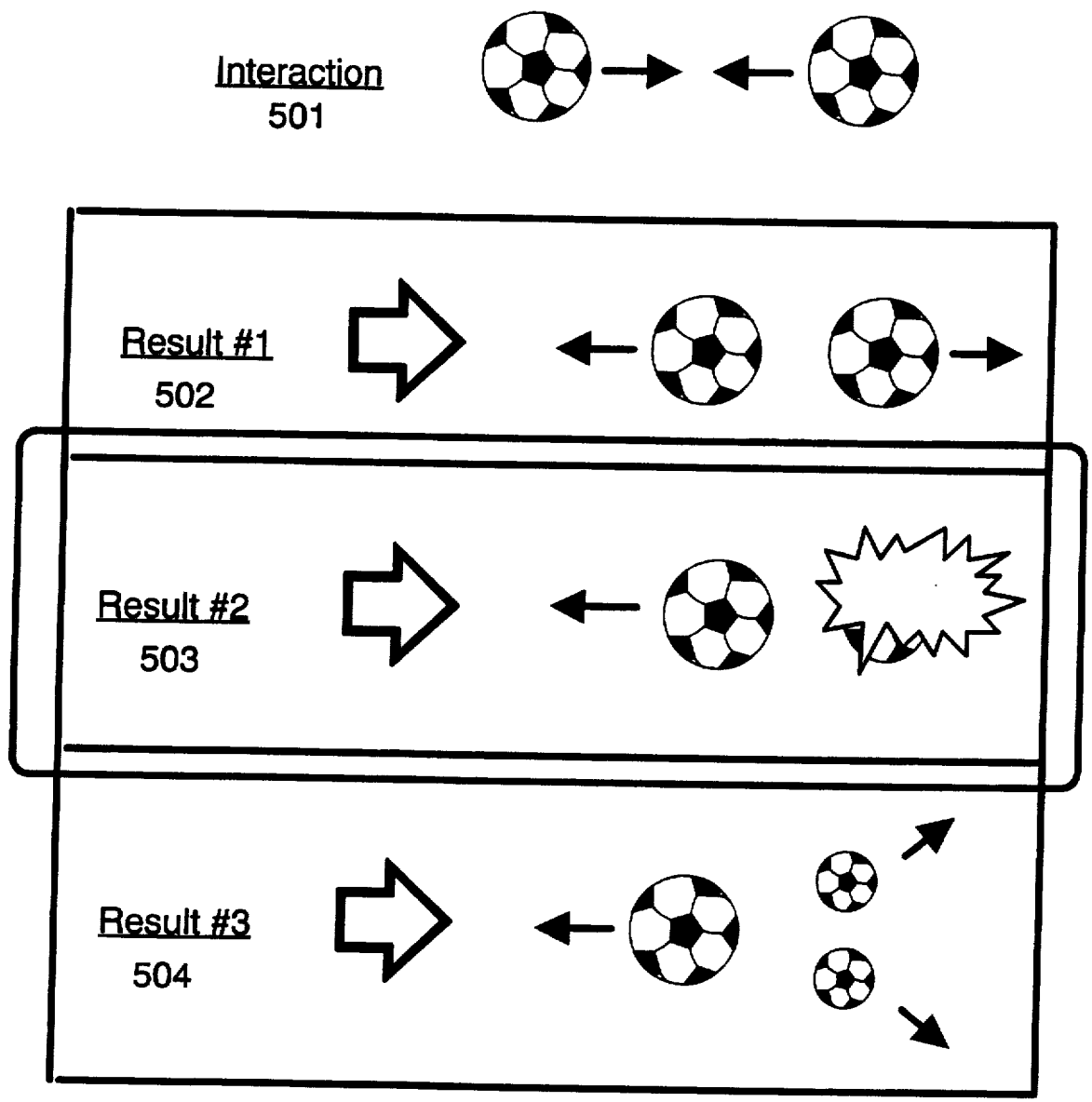
FIG. 5 shows examples of screen displays of the FIG. 1 game illustrating the function of the interaction manager of the game controller.

FIG. 5 gives an example of an action taken by the interaction manager. In this case the interaction 501 is a collision of objects. There are three possible results 502–504. The first is an elastic collision with new motions for each of the objects. The second is a collision in which one of the objects is destroyed (causing an input to the instance manager). The third is a collision in which one of the objects splits into two smaller ones. This causes a new object to be created and one of the original objects to change form. The interaction manager determines which of the possible results actually occurs (in this case 503), and communicates that result to the global state manager.

The final component in FIG. 2 is the global state manager 204. This component has the responsibility to maintain a consistent global state for the game. As inputs it takes the current states and motions, as well as any changes initiated by the character behavior controllers (arrow 216) or the other game controller elements (arrows 212–214). It then attempts to represent a global state according to the underlying principles of the game. For example, it takes the current positions and motions of the characters and attempts to describe their new positions. It contains logic to identify inconsistencies and generates inputs to the interaction manager where they occur. These inconsistencies are resolved by the interaction manager (arrow 214) before it accepts other inputs, so as to quickly determine a consistent state. This requires that the global state manager and interaction manager be designed to avoid excessive iterations to reach a consistent global state. The global state is then expressed (arrow 217) in the global state data 103. It is also communicated to the user interface (arrow 212) as necessary.

Figure 6:
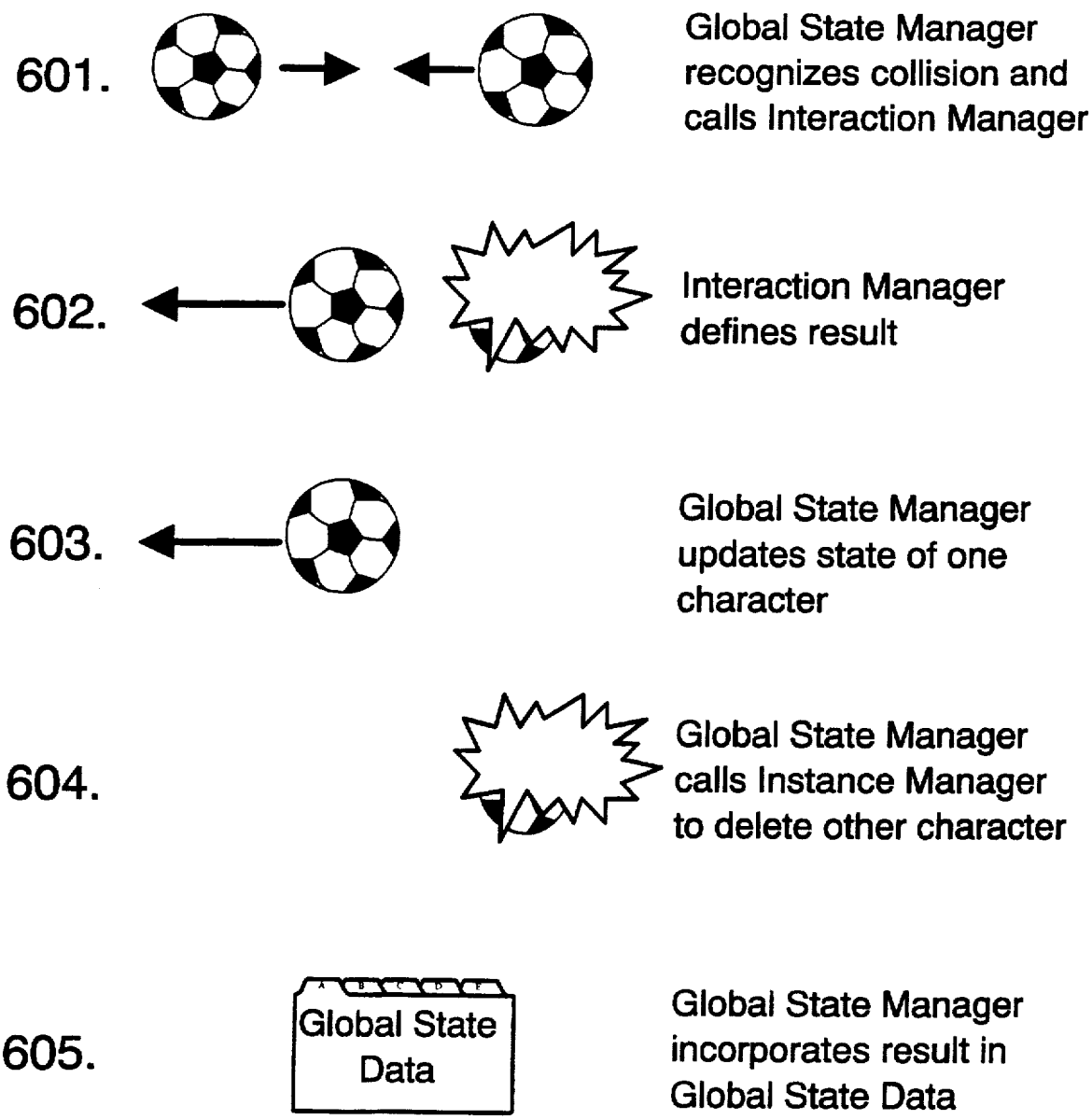
FIG. 6 shows examples of screen displays of the FIG. 1 game illustrating the function of the global state manager of the game controller.

FIG. 6 shows an example. In this case the global state manager is responsible for the motions of all the characters on the screen. It recognizes a collision 601, which is resolved by the interaction manager (event 602). It then updates the state of the single remaining character (event 603), calls the instance manager to delete the other character (event 604), and updates the position and motion information in the global state data (event 605). This completes the discussion of structure for the game controller.

Figure 7:
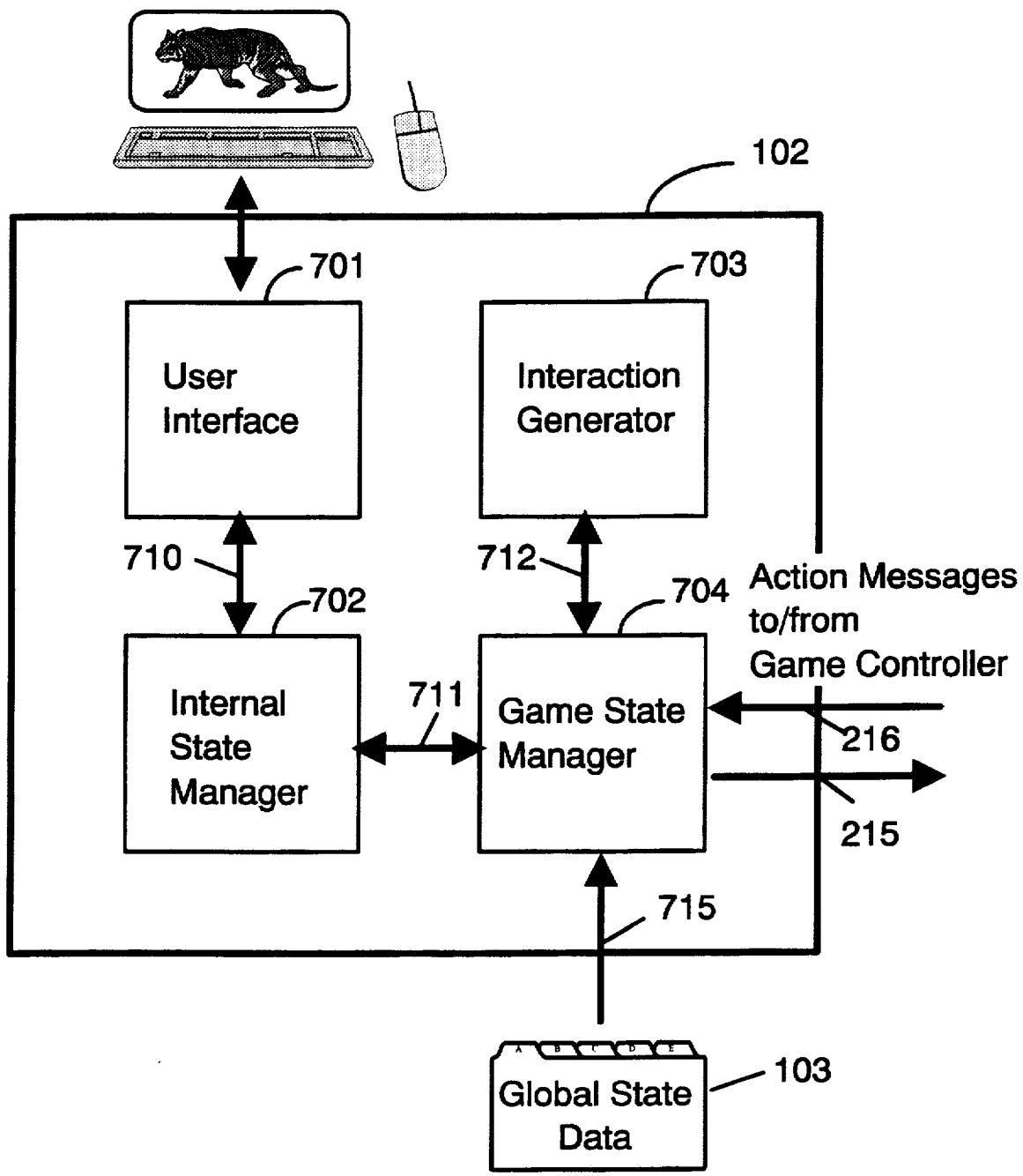
FIG. 7 is a block diagram showing the components of the FIG. 1 game involved in display of a game character.

FIG. 7 describes the structure of a character behavior controller. There are again four components: the user interface 701, the internal state manager 702, the interaction handler 703, and the game state manager 704.

The user interface 701 reacts to user control actions performed on a character instance (e.g. by mouse and keyboard) and provides user feedback on the state of the character instance (e.g. through visual image or sound). As noted earlier, it is a responsibility of the game controller user interface to perform whatever functions (if any) are necessary to see that user interface actions can be passed through. User interface actions provide inputs to the internal state manager 702, as well as the displays associated with the internal state (bidirectional arrow 710). In the preferred embodiment, the user interface 701 is responsible for positioning the character's image on the screen based upon the character's motion and state as influenced by the game controller.

The internal state manager 702 controls the state the character as embodied in the character behavior controller. A character's internal state is reflected through the user interface 701 to the user and through the game state manager 704 to the rest of the game. Changes in state initiated by the game (e.g. through action messages 216) will be communicated through the game state manager as indicated by arrow 711. (Note that since the game state involves both character states and global states, "saving" a game for subsequent play means saving not only the global state data, but also a representation of the internal states for all characters.)

The game state manager 704 is responsible for input /output functions for participation in the game. It reads the global state data 103 (arrow 715), it sends and receives action messages associated with character states and motions (arrows 215 and 216), and it directs (arrow 712) interaction handler 703 to initiate interactions with the game controller 101. The game state manager retains the identity of the character instance as assigned by the instance manager 202. Typically, the game state manager's internal logic would include a timing mechanism that would determine when the global state must be checked. Like the user interface, game state manager 704 provides input to the internal state manager (arrow 711) and reflects an externally visible substate—in this case the substate relevant to the rest of the game.

Finally, the interaction handler 703 is the local counterpart of the interaction manager 203 in the game controller 101. It receives interaction requests (arrow 712) from game state manager 704, generates interactions to be passed through to interaction manager 203, and receives interaction results (passed through from an action message 216) to be presented to the game state manager for further influence on the character's state.

Operation

To initiate the game, the user interface of the game controller provides the means to establish an initial game configuration. This includes creating instances of all of the selected characters, assigning an initial state to each, and propagating an initial version of the global state data.

Figure 8:
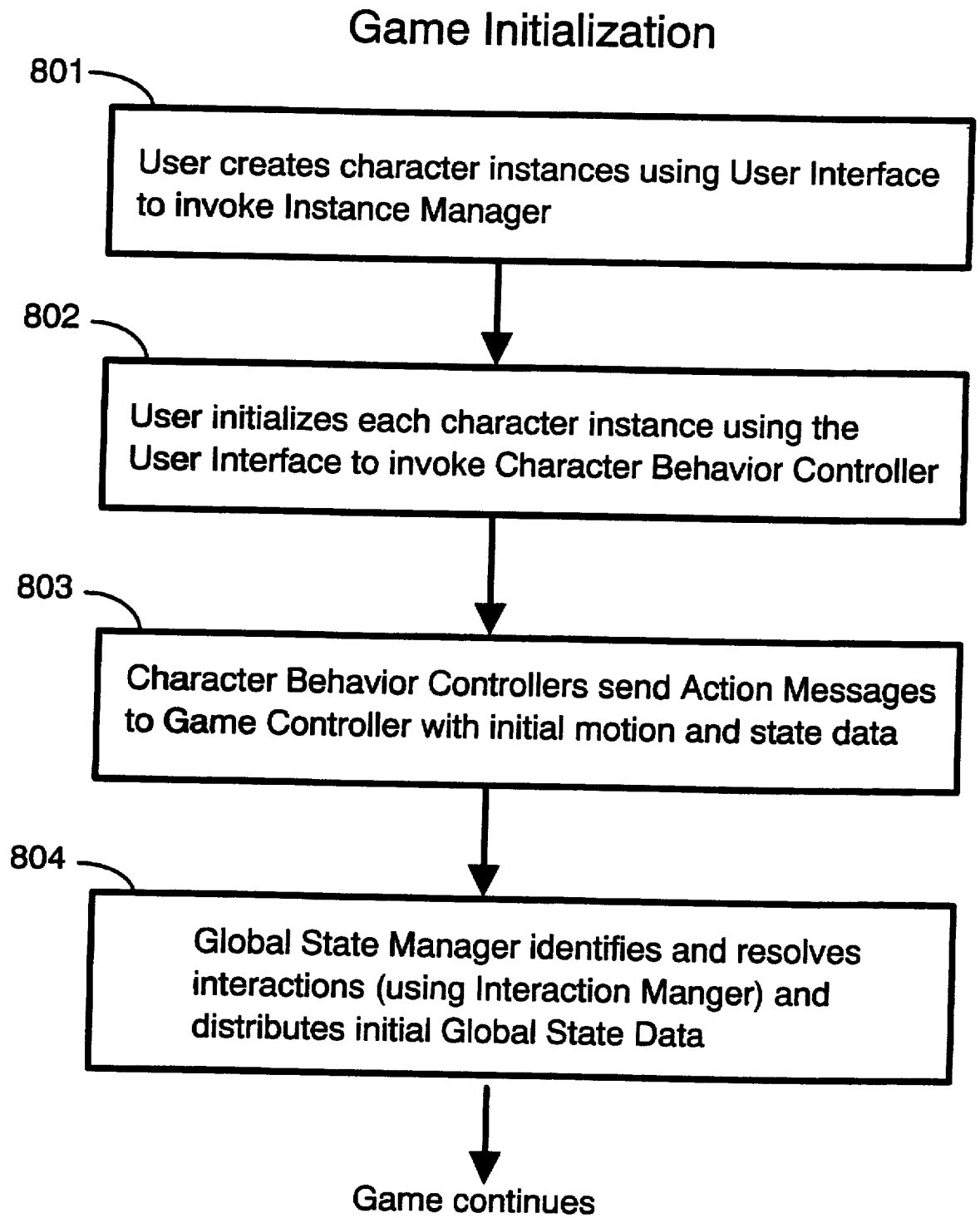
FIG. 8 is a flow chart describing the communication between the game controller and the character behavior controllers at start-up.

The process of game initialization is depicted in FIG. 8. In the first step 801, the game user invokes user interface 201 of game controller 101 to create instances of the desired character types. This involves interaction of user interface 201 with the instance manager 202, as described above in the discussion of FIG. 2.

In the next step 802, the user initializes each character instance. This may be trivial if the character has a well-defined initial state. Otherwise, this relies upon the ability of user interface 201 to pass through user control actions to the character behavior controller, as described in the discussion of user interfaces 201 and 701.

Subsequently in step 803, each character behavior controller sends an action message with initial motion and state data. The action message reflects the character's initial state as embodied in the internal state manager 702 and translated to the game substate in game state manager 704. The message is sent by game state manager 704.

Finally in step 804, the global state manager 204 receives all action messages and defines an initial global state. Any interactions at this stage are resolved through the interaction manager 203. The initial global state is then written as global state data 104 and the character behavior controllers can draw and position each character's image accordingly. At this point the initial local and global state data are complete, and the game can proceed.

Note that additional instances of character types can be added to a game in progress by the same initialization process. The new instance is positioned and initialized by user interface 201 (step 801) and then by interaction with the character's character behavior controller (step 802). When the character's character behavior controller initiates execution, it sends an action message with motion and state information to the game controller (step 803), and its presence is then reflected in the global state data (step 804).

Following initialization, the game controller 101 and the character behavior controllers 102 interact via independently-dispatched messages and the global state data 103. In the preferred embodiment, each character behavior controller and the game controller will have a defined update interval. At the expiration of this interval, a timer will cause an update to each of the control components based upon the elapsed time, the global state data, and the messages received.

For the game controller, the sequence of actions follows the information flows in FIG. 2:

1. Motion and state action messages are processed by global state manager 204. Global state interactions are identified and communicated to the interaction manager 203.
2. Interaction manager 203 resolves interactions from the character behavior controllers as well as interactions received from global state manager 204.
3. Through communication with the interaction manager 203, the global state manager establishes a new global system state. The new state is propagated in the form of an update to the global state data 103.
4. All game objects are brought into consistency with the new global system state. This may include creation or deletion of character instances by the instance manager 202, as well as changes to the user interface 201. It may also include adjustment to the individual character motions and states. In the preferred embodiment, such adjustments to the character objects are achieved by action messages sent from the game controller 101 to the individual character behavior controllers 102. The character behavior controller reacts to these action messages according to its own logic to complete the update sequence.

For the character behavior controllers the actions follow the information flow described in FIG. 7. The sequence is as follows:

1. The game state manager 704 reads the global state data 103 and processes any outstanding action messages from game controller 101. Each character's image is presented on the screen based the character's game state as corrected by any action messages.
2. Changes in game state are provided by game state manager 704 as an input to the internal state manager 702. The character's internal state is synchronized with the global state data and any other game input or user interface actions. The internal state is updated for the next time interval.
3. The new internal character state is communicated to the game state manager 704.
4. Game state manager 704 generates action messages reflecting the change of character state. State and motion action messages are sent directly from game state manager 704 to game controller 101; interactions are communicated via interaction handler 703. Since the character instance controls its own internal state, it may choose to make some state and motion transitions dependent upon acknowledgment from the game controller 101 so as to avoid race conditions. This acknowledgment may be received either via action message or by inspection of the global state data 103.

Figure 9:
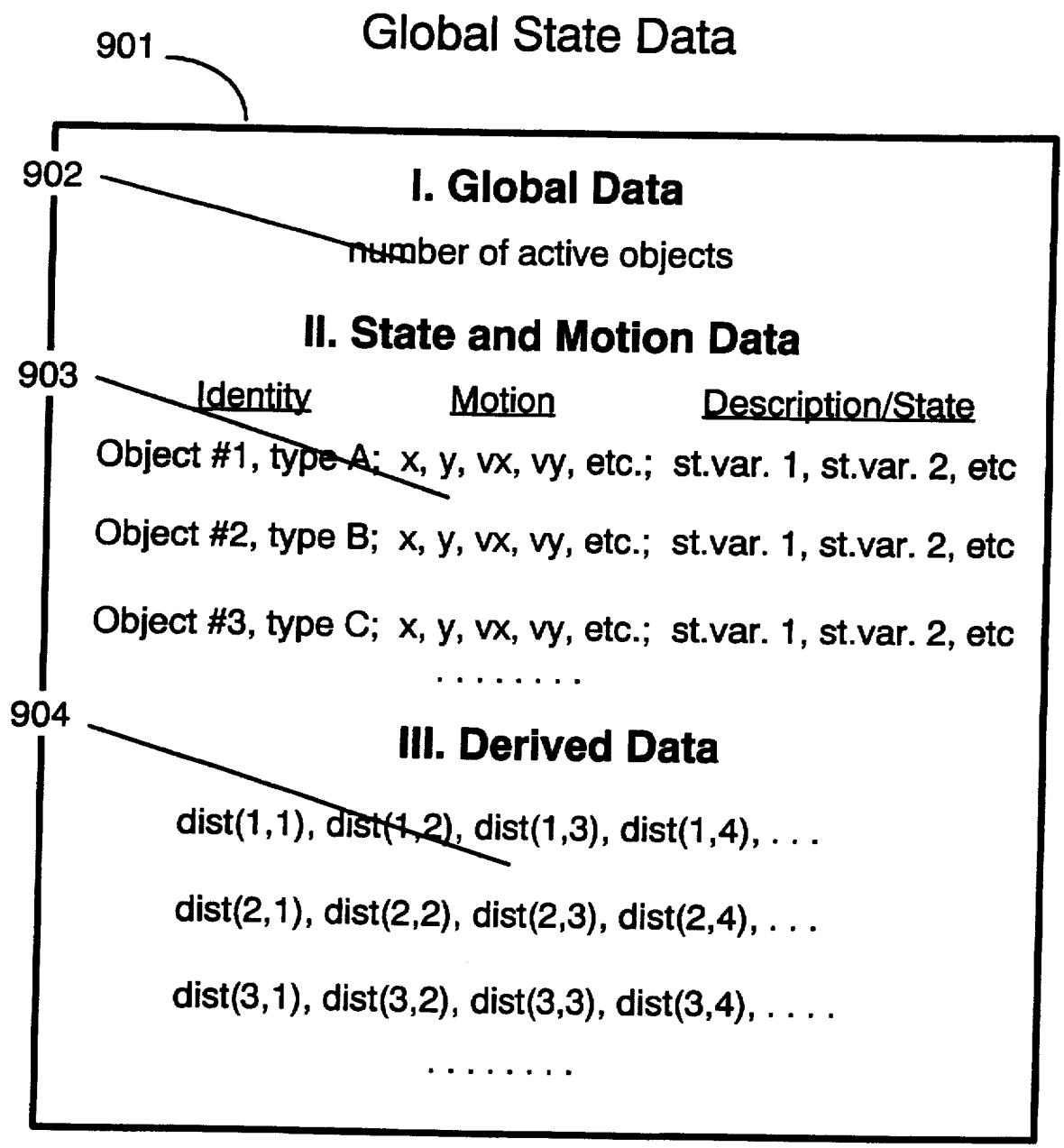
FIG. 9 is a representation of the global data accessed by each of the character behavior controllers in determining its behavior.

FIG. 9 gives a representation of the global state data 103 in the preferred embodiment. In the figure the global state data has three parts: global data 902, state and motion data 903, and derived data 904. The global data are descriptive of the game as a whole; in the figure it is the number of initialized characters. The state and motion data 903 are in the form of a matrix with a row for each character instance in the game. The data in each row are divided into three sections. The first of the sections contains identity information for the object, namely its instance and character behavior controller identities, as assigned by the instance manager 202. The second section is descriptive of the motion of the object, including as examples the components of position, velocity, and acceleration for the object in question. The third section describes the characteristics and externally-observable state of the object. The specifics of the observable state will depend upon the special features of individual games. As examples, the observable state may indicate the fearsomeness of a monster or the military value of a soldier. The number of components of this third section will depend upon the specifics of the game.

Derived data 904 refers to data that can be calculated from the state and motion data 903, but is included for efficiency because it would need to be recalculated by each character behavior controller individually. The example in FIG. 9 is the matrix of distances between character instances. This can be derived from the motion data, but in some cases it will be more efficient for the global state manager 204 to calculate it once and for all, and distribute it with the global state data 103.

FIG. 10 describes the action messages sent between the character behavior controllers 102 and the game controller 101 in the preferred embodiment. Messages from the character behavior controllers to the game controller (FIG. 10A) include the character-initiated changes in state or motion. These are of the same type as the state and motion data in the global state data 103, but they have not yet been resolved for possible conflicts between characters. In addition the character behavior controllers may user action messages to communicate interactions. These may be of two types:

1. Character-to-character interactions, such as an attraction or an attack, are communicated by identifying the other character or characters and the interaction type.
2. Character-to-game controller interactions can include, for example, spawning of additional characters or deletion of the character itself.

Messages from the game controller to the character behavior controllers (FIG. 10B) represent fewer types and result from resolved interactions. As noted above, the resolution of an interaction may result in changes to a character's state, motion, or both. The interaction result message allows a character to react directly to the result of an action it initiates.

It should be noted that for any particular game, the specific realization of the global state data of FIG. 9 and the action messages of FIG. 10 determine the interface between the character behavior controllers and the game controller. Hence, given that a character behavior controller supports the basic communications paradigms of a given game, the requirements for compatibility are ability to interpret and react to action messages ability to read and understand global state data understanding of character states, motions, characteristics, and interactions Any character behavior controller that meets these requirements, regardless of its other behavioral logic or screen appearance, can participate in the game. Thus once the interface characteristics are set, new characters can be conceived and implemented by any developer. Similarly, new game controllers can be implemented to work with existing characters.

Example Game Implementation

This section illustrates the operation of the invention by concentrating on a particular example game implemented using Microsoft Visual Basic Version 3.0. A complete program listing is attached as an Appendix. While the listing is self-contained, this section describes the operation of the game and indicates how the implementation realizes the structures of the invention. To simplify implementation, these structures are not always broken out as independent modules of the code. For example, user interface actions are frequently invoked where they arise, rather than being collected into a separate code module. This example game has been demonstrated on a Gateway 2000 PC, model 4DX-33V, with DOS version 6, Microsoft Windows 3.1, and the Visual Basic runtime libraries.

The example game includes a game controller 101 and two character behavior controllers 102, for an elephant and a mouse. To the user, the game controller 101 appears as the background of the game with a menu bar allowing the user to introduce new characters and to exit the game. For this sample application, the behavior of the characters is quite simple: both characters move so as to stay within the frame area defined by the client display, and the elephant is afraid of mice. Specifically, if the mouse gets too close to the elephant, then the elephant attacks it. The attack is resolved by the game controller so that the mouse either escapes or is deleted. If the mouse escapes, then the elephant retreats; the mouse retreats whenever under attack. The character behavior controllers have been designed so that multiple instances of each character can be created through the client user interface and managed independently by the character behavior controllers. In this example game it is simple to verify that the game controller and the character behavior controllers are independent processes: they all appear as independent items in the Windows 3.1 Task List.

The underlying communication between character behavior controllers and game controller is based upon Microsoft Windows Dynamic Data Exchange (DDE). This is a facility of Microsoft Windows 3.1 which is designed specifically for application-to-application messaging. It is described, for example, in the Microsoft Visual Basic Programmer's Guide (Version 3.0), Chapter 21. The game controller 101 is implemented as a DDE destination application, which accesses the services provided by the character behavior controllers as DDE source applications.

In the code, an (invisible) text box is created by the game controller 101 for each active character behavior controller 102 and that text box is linked through DDE to a text box on the source application. Action messages 215 from the character behavior controllers 102 to the game controller 101 are updates to the linked data in the appropriate text box. Action messages 216 from the game controller 101 to the character behavior controllers 102 are implemented as LinkExecute messages of DDE for character initialization, and thereafter appended to the global state data 103. In this way, each character behavior controller accesses the global state data and receives any action messages at the same time. All messages are text strings with individual fields delimited by tab characters. The messages are parsed in the applications by (invisible) grid controls, which translate the textual entries into fields of a spreadsheet for interpretation by the applications.

The global state data 103 are written by the game controller application to the Windows clipboard, and accessed independently by each of the character behavior controllers. The clipboard is hence used as a memory file precisely as in the description of the preferred embodiment. (In a commercial application, a specialized memory file. would be used so as not to interfere with or be affected by other applications.) The clipboard data consist of an initial line giving the total number of lines in the table (global data 902), followed by a sequence of lines corresponding to character instances (state and motion data 903). In this game there is no derived data 904. As noted, action messages from the game controller to the character behavior controllers are appended as additional lines to the global state data.

FIG. 11 shows what the global state data looks like for game with i elephant and two mice. There are a total of four rows of data (as given by the first entry) with no action messages to follow (second entry). The succeeding rows give a sequence 10 data items for each character instance. These are character instance identity instance type=character behavior controller identity (from game controller)

x position y position x velocity y velocity x acceleration y acceleration character size (=length×height for the current image)

character attacked (0=no attack in progress)

An instance type entry of 0 means that the character has been deleted and the identity value can be reused by later character creation.

Character behavior controllers register themselves with the game controller by updating a file (register.txt) which is read by the game controller on start-up, at which time the game controller establishes the application identities. Based upon the registration file, the user interface 201 of the game controller 101 allows the user to create instances of each registered character type. The initialization process permits the user to specify the initial position and velocity vector for each new instance. FIG. 12 shows how this is done. The user first selects the type of character (FIG. 12A), then clicks the initial position of the character (FIG. 12B), and finally drags the mouse to create a vector which represents the initial velocity (FIG. 12C). FIG. 12D shows the resulting motion of the character.

As soon as the character type is identified, the instance manager function 202 assures that a DDE link is up to the appropriate character behavior controller 102. When the user finishes initializing the character instance, the instance manager 202 assigns an identity number to that instance and sends the initialization data to the character behavior controller. Character deletion can also occur. In that case the instance manager sets the character type to 0 and sends an action message to the appropriate character behavior controller. The DDE link is left up for subsequent character creation, even if there are no more active characters associated with the character behavior controller.

The interaction manager function 203 is invoked to deal with attacks by the elephant. An attack is indicated by an interaction message sent by the character behavior controller, giving the identity of the elephant and the mouse instances. The interaction is resolved by a random number generator, which determines whether the mouse escapes or is deleted. An interaction response message is sent back to the elephant to communicate the result. Deletion of the mouse is handled by the instance manager, which sets the instance type to 0 and causes an appropriate action message to be sent to the mouse's character behavior controller. FIG. 13 shows how this interaction appears to the user. FIG. 13A shows the screen just prior to the attack. In FIG. 13B the mouse gets close enough and the attack is initiated with appropriate sound effects. The attack is communicated to the interaction manager for resolution and made visible through the elephants state in the global state data. In FIG. 13C the mouse recognizes it is under attack, draws a circle around its image, and retreats. The outcome in this instance that the mouse escapes. Hence in FIG. 13D the elephant retreats, and the mouse removes the circle, showing it is no longer under attack.

In this game no constraints are imposed by the game controller on the actions of the characters, so that no interactions are generated by the global state manager 204 itself. Hence the global state is affected only by the creation and deletion operations and the actions of the characters. Inputs received from the character behavior controllers are immediately entered into the global state manager's internal representation of the global state. Those data are written to the clipboard every 500 ms, at which point they become the global state data 103 accessible to all of the character behavior controllers.

The character behavior controllers 102 in this game operate on 400 millisecond timers. Hence every 400 ms, the character behavior controller's game state manager 704 reads the global state data 103 and also invokes the user interface 701 to draw the character in the proper screen position. The global state data 103 are used by the internal state manager 702 as a basis to perform an update to the character's internal state. .(In addition to the global state, the internal state captures the character's animation and whether it is retreating or under attack.) Based upon the new state, the game state manager 704 produces an action message which reports the character's motion and state to the game controller. The format of the message is essentially the same as the sequence of entries on a single line of the global state data (as described above). Additional action messages communicate deletion operations. Elephant attacks are initiated by interaction messages sent from the interaction handler 703.

Both the mouse and the elephant recalculate position and velocity based upon past motion values and assumed inelastic collisions with the boundaries of the game controller display window. Acceleration values differ for the mouse and elephant: the mouse moves randomly, the elephant in a straight lines except as a result of attacks. In both cases the animation state is randomly determined.

As noted, the user interface 701 allows both types of characters to move themselves based upon their current position data (as influenced by the game controller 101) and to animate their images. However, the characters also supply their "window handles" to the game controller; these are used by the game controller 101 to manage the back-to-front order of the character images on the screen. Direct user input to the character behavior controllers is also provided for: the user can click on a character to cause its deletion. Specifically, clicking on a character causes the character behavior controller to send an action message invoking an interaction with the game controller for character deletion.

It should be noted finally that while this example game demonstrates the invention, there has been no attempt to deal comprehensively with error conditions, as would routinely be done in a commercial application. For example there is no attempt to deal with loss of messages or with other operations that fail to complete. These would normally be handled by timeout and recovery. Similarly, the sizes of the grid controls should be dynamically adjusted to avoid loss of data in parsing global state data and messages.

In summary, this example shows an extensible game in that there is an initial game (game controller plus either character behavior controller) to which a second character type with associated character behavior controller can be added with full participation in the game. The game controller and the character behavior controllers are all independent application processes. Furthermore, the game has been structured so that there is nothing specific to elephants and mice—characters interact with each other according to motion, size, and state—so there would be no difficulty in adding a monkey and getting consistent game behavior. Finally, the game controller in the example is a distinct process from the character behavior controllers, and hence can be replaced by another game controller giving different behavior. In the example, replacing the line, outcome%= Int(1+2 * Rnd(1)) in the game controller's attack_char routine by

*outcome*

=2 gives a new game controller whose logic never causes a character instance to be deleted as an outcome of an attack.

Other Game Scenarios

To elaborate on the previous example, this section briefly describes two additional scenarios that illustrate the range of application of the invention. The first has very simple interactions between characters; the second is more complex.

1. Bouncing animated objects

Characters in this game are animated objects which bounce off each other when they collide. The true local state of a character is reflected in the animation, but the interactions of characters depend purely upon mass (i.e. character type) and position. Hence there is no game state information associated with a character. The animated image that represents a particular character is purely the responsibility of the character behavior controller and has nothing to do with the game controller.

Objects move according to laws of motion as derived from initial positions and velocities. Since the objects do not themselves initiate interactions, all interactions are detected by the global state manager, as it attempts to resolve the positions and motions reported by the individual objects. Collisions are elastic and change the motions and positions of the character objects, according to rules embodied in the interaction manager. All changes resulting from a collision are communicated to the characters by action messages and reflected in the global state data.

New character behavior controllers need only understand the formats for position and motion to participate in the game.

2. Toy soldiers

Characters in this game are soldiers, and interactions are battles. To support these interactions, the game state of a character instance represents the military value currently associated with that instance. The local state of that character instance includes the game state as well as any animation associated with that character's image on the screen.

In this example, the interactions may be initiated by the global state manager (based upon juxtaposition) or by the character behavior controllers as declared attacks. Different character types are able to initiate attacks from different distances. Battle interactions are resolved by the interaction manager based upon the military values of the elements involved. These military values may be enhanced by relation to background objects such as walls or hills (which are treated by the game as characters with interactions as in the first example). Results of battles can include instance deletion or modification of military value, as determined by the interaction manager.

Action messages from character behavior controllers to the game controller describe intended motions and attacks. Action messages from the game controller to the character behavior controllers redefine both motion and/or state after a battle. The global state data show motions and military values for all characters in the conflict, as well as the positions and types of the background objects. Access to global state data can be restricted, so that characters know more about their allies than their enemies.

In this second case, new character behavior controllers must understand military values and rules of engagement, as well as the significance of background objects, to participate in the game.

Other Embodiments

This invention relies upon the underlying operating system environment to provide the multi-tasking, interprocess communication, and user interface services which underlie the game. For each of these services, there are many operational variants that can be used to implement the game. In addition, different games may organize the division of function between game controller and character behavior controllers differently. The primary variants are as follows:

1. Multi-tasking Operating system

The invention preferably employs a multi-tasking operating system, so that each of the character behavior controllers can execute its own logic simultaneously with the others and with the game controller. Examples of multi-tasking operating systems include Unix, distributed for example by the Santa Cruz Operations (SCO), OS/2 from IBM, and Microsoft Windows NT and Microsoft Windows 3.1. (This last example does not provide for preemption of running applications, and hence can only be used if each of the active applications appropriately relinquishes control of the processor.) As noted above, the example game application is based upon facilities available in Window 3.1.

2. Communications

The preferred embodiment uses a combination of global state data propagated as a memory file with application-to-application messaging for action messages. In fact, the invention can be practiced in any environment which permits global state data and action messages can to be sent by any means.

FIG. 14 gives an overview of communications alternatives. For application-to-application messaging these include:

Action messages sent by any form of interapplication messaging. These will be operating-system specific (e.g. Unix message queues) and may allow the game controller and the objects to be executed on different processors or even different computers.

Action messages from the game controller to the character behavior controllers combined with the global state data. Specifically, the applications can learn their new states and motions from the global state data. In this case at the start of each update cycle, the character behavior controller would read its current state from the global state data, update its internal state as described for receipt of an action message from the game controller, and then proceed to calculate the new state, motion, and interactions as described above.

Action messages handled by the memory file mechanism used for the global state data. In this case, memory file objects would be created for each character behavior controller and each direction of communication. Action messages would be written to the appropriate memory file object and read by the intended recipient. This mechanism may supported by the operating system as a so-called pipe. In the example application, action messages from the game controller 101 to the character behavior controllers are added to the global state data 103 and identified by the character behavior controller to which they apply.

For global state data the alternatives include:

Global state data handled by multiple messages to the character behavior controllers. These messages may not all be the same, if different classes of applications have differing degrees of system knowledge. Alternatively, the global state data may be represented as multiple memory file objects, and different applications can have different rights to access those objects.

Global state data sent indirectly. It is not even necessary that the game controller distribute the global state data, so long as it can assure that the contents represent a consistent game state. For example, each character behavior controller could send out its own state data, if that data represented a response by the game controller to the character behavior controller's action message requesting a change in state or motion.

Finally, it should be noted that interprocess communication can also include operating system primitives, such as semaphores, to directly synchronize the actions of different processes. (See for example Helen Custer, Inside Windows NT, page 101.)

3. User interface

In the preferred embodiment, character behavior controllers are responsible for drawing their own images based upon internal state and positioning those images based upon the global state data. These facilities are provided by the Microsoft Windows and OS/2 graphical environments and by X-Windows for the Unix operating system. In Windows 3.1, the game controller application can also control the motion of the characters directly by using the window handles of the character instances to move their windows. Going even farther, in OLE2 the character window could be a game controller object, which would redraw its image using data provided by the character behavior controller over the OLE2 application link. (These capabilities of OLE2 are described in the Microsoft Visual Basic Programmer's Guide, Chapter 21 and in the Microsoft Visual C++ Class Library User's Guide, Chapter 18.)

The role of the user interface 201 can also be quite different in different games: at one extreme it can provide game-background displays and mediate user input to all the character behavior controllers; at the other extreme its role could be limited to initialization and selection of characters, with further displays and interactions handled by the character behavior controllers. In a multi-character screen saver, the user's interaction with both the game controller and the character behavior controllers would be confined to initialization and configuration.

Where the character behavior controllers handle input and displays directly, the user interface can manage contention for display and other resources. For example, it can determine the stacking order of character images on the visual display, or which character instance will have control of audio output. This may be done directly by the game controller (if it has appropriate security rights) or by communication with the character behavior controllers.

4. Miscellaneous

The preferred embodiment assumes that character behavior controllers are as independent as possible of the game controller. In specific game instances, some portion of responsibility for character state or motion may be delegated to the game controller, so as to achieve global control of some portion of the game state. In such cases, the invention still provides the means to coordinate that part of character behavior which remains the responsibility of the individual character behavior controllers.

Finally, it should be noted that the invention can be implemented with game controllers or character behavior controllers on multiple computers in a computer network, using whatever communication networking exists to send messages between machines. This can include traditional communication mechanisms such TCP/IP, or higher-level constructs such as remote procedure calls. DDE (as in the example game) is currently supported between computers in the for the Microsoft Windows for Workgroups product and in Windows NT. In addition, the X-Windows protocol would allow a game controller or character behavior controller to be separated from the computer with its user displays.

5. Dynamic Link Libraries

In an alternative embodiment, an application process (the "operating application") takes over the role of the operating system, and the character behavior controllers and/or the game controller are embodied as separately loadable procedures for that application. In this embodiment, new character behavior controllers and new game controllers can be incorporated into a single game application process.

The character behavior controllers and/or the game controller can be implemented as procedures in dynamic link libraries (DLL's) under Windows 3.1 or Windows NT. A dynamic link library is a collection of program logic procedures that are linked to executing application processes at run time. A DLL is like an application process, except that its logic does not respond spontaneously to messages, but is instead invoked by an application client. A description of DLL's and their operation is given in "Inside C++ by David J. Kruglinski (Microsoft Press, Redmond, Wash., 1993), p. 510 and in "Visual Basic Programmer's Guide to the Windows API" by Daniel Appleman (Ziff-Davis Press, Emeryville, Calif., 1993), pp. 4–7, which are hereby incorporated by reference.

When, the game controller and the character behavior controllers are embodied as procedures in dynamic link libraries, a new game controller or character behavior controller is added by loading its DLL and invoking its procedures in the operating application. A game controller or character behavior controller can be replaced by substituting another DLL with new logic. It should be noted that the program logic for the operating application must include a reference to a DLL procedure in order for that procedure to be invoked for the game.

Procedures to allow an application to incorporate new DLL's are well known in the art. For example, Visual Basic custom controls are DLL's to simplify program development that can be added to the Microsoft Visual Basic development environment application. These are described in "Microsoft Visual Basic Control Development Guide" (Microsoft Corporation, Redmond, Wash., 1993), pp. 1–16, hereby incorporated by reference. A general method for adding a DLL to a running program is described in "Programming Windows 3.1" by Charles Petzold (Microsoft Press, Redmond, Wash., 1992), pp. 938–939, also incorporated by reference. Replacement of DLL's can also be used. For example, the operating application can include references to dummy DLL's to be replaced by subsequently-installed character behavior controllers. The identities of the active character behavior controllers can be written by the installation procedure in a registration file.

In this embodiment, the operating application performs functions supplied by the operating system in the multiprocess environment, thereby enabling the structural elements of the multi-process environment to be used here as well. Preferably, the operating application periodically invokes the DLL procedures which embody the logic for the game controller and the character behavior controllers. In so doing, it supplies the process scheduling and timing functions provided by an operating system in a multi-application environment. In addition, since DLL's do not directly receive messages, the operating application enables communication between the game controller and character behavior controllers by passing references to common data.

Specifically, since the game controller and the character behavior controllers are procedures invoked by the same application process, they can communicate by reference to data elements within a common address space. The global state data is realized as a data structure belonging to the game controller. The operating application receives a reference parameter describing the location of the global state data from the game controller when the game controller procedure is invoked. This reference parameter is passed to the character behavior controllers when they are invoked. Since the character behavior controllers share the same address space as the game controller, the global state data can be read directly by the character behavior controllers when they are invoked by the operating application. The size of the global state data is specified by the data itself, as in FIG. 9 and the example application.

Similarly, messages between game controller and character behavior controllers are passed by reference at the invocation and return of the character behavior controllers. Messages from the game controller to the character behavior controllers are deposited in data structures dedicated to specific character behavior controllers or combined with the global state data as in the example application. When the character behavior controllers are invoked by the operating application, they receive parameters that define the location of the message structures. In the other direction, the message data structures are written by the character behavior controllers and accessed by the game controller according to parameters received from the character behavior controllers and passed to the game controller by the operating application. With these facilities for communications, the operating application can provide the communications functions described for the game controller and the character behavior controllers of this invention and indicated in FIG. 10. As before, the requirements for compatibility of a character behavior controller are ability to interpret and react to action messages, ability to read and understand global state data, and understanding of character states, motions, characteristics, and interactions. The block diagrams for the overall game structure (FIG. 1), the game controller (FIG. 2), and the character behavior controllers (FIG. 7) also remain valid. The game initialization flow chart of FIG. 8 is similarly valid; in this embodiment the operating application invokes the game controller so as to present the user interface to the user.

This additional aspect of the invention has both advantages and disadvantages as compared with the aspect based upon independent application processes for game controller and/or character behavior controllers. The advantages relate to ease of a basic implementation. Coordination between the character behavior controllers and the game controllers is simpler, because they all form part of the same process. Further, interactions with other running processes are also simpler, because the entire game is a single process unit. These implementation advantages, however, come at the expense of flexibility and independent character behavior. First, as noted above, the program logic for the operating application must include references to any DLL procedures to be used for game controllers or character behavior controllers, so that adding new, independently-developed character behavior controllers is less straightforward. Second, the game controller and character behavior controllers cannot exist independent of the operating application and cannot respond directly to user inputs, which are sorted out by the operating application for communication to the other procedures. Based upon these advantages and disadvantages, this additional aspect of the invention would be used for simplicity of implementation, and the aspect based upon independent application processes would be used for greatest flexibility and autonomy of character behavior controllers.

APPENDIX

```
VERSION 2.00
Begin Form client1
    BorderStyle     =   0   'None
    Caption         =   "Animals"
    ClientHeight    =   3405
    ClientLeft      =   630
    ClientTop       =   1995
    ClientWidth     =   5055
    Height          =   4095
    Left            =   570
    LinkTopic       =   "Form2"
    Picture         =   (Bitmap)
    ScaleHeight     =   3405
    ScaleWidth      =   5055
    Top             =   1365
    Width           =   5175
    Begin Grid incoming
        Cols            =   15
        FixedCols       =   0
        FixedRows       =   0
        Height          =   255
        Left            =   3480
        Rows            =   1
        ScrollBars      =   0   'None
        TabIndex        =   4
        Top             =   3000
        Visible         =   0   'False
        Width           =   1215
    End
    Begin Timer Timer1
        Enabled         =   0   'False
        Interval        =   500
        Left            =   2880
        Top             =   1800
    End
    Begin Grid gstate
        Cols            =   15
        FixedCols       =   0
        FixedRows       =   0
        Height          =   1335
        Left            =   3000
        Rows            =   10
        TabIndex        =   3
        Top             =   120
        Visible         =   0   'False
        Width           =   1695
    End
    Begin TextBox instruct
        BorderStyle     =   0   'None
        ForeColor       =   &H00FF0000&
        Height          =   255
        Left            =   120
        MultiLine       =   -1  'True
```

```
         TabIndex        =      2
         Text            =      "Please select character"
         Top             =      120
         Width           =      2775
      End
      Begin ListBox choice
         Height          =      810
         Left            =      360
         TabIndex        =      1
         Top             =      480
         Width           =      1575
      End
      Begin TextBox rcv
         Height          =      375
         Index           =      1
         Left            =      240
         TabIndex        =      0
         Tag             =      "1"
         Top             =      2280
         Visible         =      0      'False
         Width           =      2055
      End
      Begin Line line1
         BorderColor     =      &H000000FF&
         BorderWidth     =      3
         Visible         =      0      'False
         X1              =      3000
         X2              =      3600
         Y1              =      2760
         Y2              =      2400
      End
      Begin Shape circle1
         BorderColor     =      &H0000FF00&
         BorderWidth     =      3
         Height          =      495
         Left            =      2760
         Shape           =      3      'Circle
         Top             =      2520
         Visible         =      0      'False
         Width           =      375
      End
      Begin Menu game
         Caption         =      "Game"
         Begin Menu next_char
            Caption      =      "Next Character"
         End
         Begin Menu exit
            Caption      =      "Exit"
         End
      End
   End
End
```

```
Declare Sub SetWindowPos Lib "User" (ByVal hWnd As Integer, ByVal hWndInsertAfte
r As Integer, ByVal X As Integer, ByVal Y As Integer, ByVal cx As Integer, ByVal
 cy As Integer, ByVal wFlags As Integer)
Declare Function SetActiveWindow Lib "User" (ByVal hWnd As Integer) As Integer
Declare Function SetFocusAPI Lib "User" Alias "SetFocus" (ByVal hWnd As Integer)
 As Integer Dim msg(15) As Integer, serv_used(10) As Integer
Dim prep As Integer, nextchoice As Integer, madechoice As Integer
Dim char_app As Integer, char_str(10, 4) As String
Dim nmess As Integer, act_mess As String Const SWP_NOMOVE = &H2
Const SWP_NOSIZE = &H1
Const HWND_TOP = 0
Const HWND_TOPMOST = -1
Const HWND_NOTOPMOST = -2
Const DDE_NO_APP = 282

Sub attack_char (ctype%, att_row%, def_row%)

outcome% = Int(1 + 2 * Rnd(1))
mess$ = CStr(ctype%) & Chr(9)
Select Case outcome%
Case 1
    mess$ = mess$ & CStr(-2) & Chr(9) & CStr(att_row%) & Chr(9)
    mess$ = mess$ & CStr(def_row%) & Chr(9) & CStr(0) & Chr(13)
    act_mess = act_mess & mess$
    nmess = nmess + 1
    Debug.Print mess$
    gstate.Row = def_row%
    gstate.Col = 1
    def_type% = gstate.Text
    Call delete_char(def_type%, def_row%)
Case 2
    mess$ = mess$ & CStr(-2) & Chr(9) & CStr(att_row%) & Chr(9)
    mess$ = mess$ & CStr(def_row%) & Chr(9) & CStr(1) & Chr(13)
    act_mess = act_mess & mess$
    nmess = nmess + 1
    Debug.Print mess$
End Select End Sub Sub delete_char (ctype%, del_row%)
    mess$ = CStr(ctype%) & Chr(9) & CStr(-1) & Chr(9)
    mess$ = mess$ & CStr(del_row%) & Chr(9)
    mess$ = mess$ & CStr(0) & Chr(9) & CStr(0) & Chr(13)
    act_mess = act_mess & mess$
    nmess = nmess + 1
    gstate.Row = del_row%
    gstate.Col = 1
    gstate.Text = 0
    gstate.Col = 2
```

```
        xc! = gstate.Text
        gstate.Col = 3
        yc! = gstate.Text - 500
        gstate.Col = 8
        rc! = gstate.Text
        rc! = Sqr(rc!) * 75
        red& = line1.BorderColor
        Circle (xc!, yc!), rc!, red&
        anyleft% = 0
        For i% = 1 To nextchoice - 1
            gstate.Row = i%
            gstate.Col = 1
            anyleft% = anyleft% + gstate.Text
        Next i%
        If anyleft% = 0 Then dummy% = SetActiveWindow(hWnd)

End Sub

Function next_slot ()
    gstate.Col = 1
    For i% = 1 To nextchoice - 1
        gstate.Row = i%
        j% = gstate.Text
        If j% = 0 Then
            next_slot = i%
            Exit Function
        End If
    Next i%
    next_slot = nextchoice
End Function Sub set_global (lastcol As Integer)
    mess$ = CStr(nextchoice - 1) & Chr(9) & CStr(nmess) & Chr(13)
    For i% = 1 To nextchoice - 1
        For j% = 0 To lastcol
            gstate.Row = i%
            gstate.Col = j%
            mess$ = mess$ & gstate.Text
            If j% = lastcol Then
                mess$ = mess$ & Chr(13)
            Else
                mess$ = mess$ & Chr(9)
            End If
        Next j%
    Next i%
    mess$ = mess$ & act_mess$
    If nmess <> 0 Then Debug.Print act_mess$
    act_mess$ = ""
    nmess = 0
    Clipboard.SetText mess$
    DoEvents
End Sub Sub win_order ()
```

```
    For i% = 1 To nextchoice - 1
        gstate.Row = i%
        gstate.Col = 10
        hand% = CInt(gstate.Text)
        flag% = SWP_NOMOVE And SWP_NOSIZE
        Call SetWindowPos(hand%, HWND_TOP, 0, 0, 0, 0, SWP_NOMOVE + SWP_NOSIZE)
    Next i%

End Sub

Sub choice_Click ()

On Error GoTo LinkError n% = choice.ListIndex + 1
    newtopic$ = char_str(n%, 1) & Chr(124) & char_str(n%, 2)
    newitem$ = char_str(n%, 3)
    char_app = n%

If serv_used(char_app) = 0 Then
        rcv(char_app).LinkTopic = newtopic$
        rcv(char_app).LinkItem = newitem$
        rcv(char_app).LinkTimeout = 50
        rcv(char_app).LinkMode = 1
        serv_used(char_app) = 1
    End If mess$ = CStr(0) & Chr(9) & CStr(char_app) & Chr(9)
    mess$ = mess$ & CStr(client1.ScaleWidth) & Chr(9) & CStr(client1.ScaleHeight)
    rcv(char_app).LinkExecute mess$
    instruct.Text = "Now click on location"
    choice.Visible = 0
    madechoice = 1

Exit Sub

LinkError:
    If Err = DDE_NO_APP Then
        Call SetWindowPos(hWnd, HWND_TOPMOST, 0, 0, 0, 0, SWP_NOMOVE + SWP_NOSIZE)
        t% = Shell(char_str(n%, 1))
        Call    SetWindowPos(hWnd,  HWND_NOTOPMOST,  0,  0,  0,  0,    SWP_NOMOVE +
SWP_NOSIZE)
        Resume
    Else
        MsgBox "Error " & CStr(Err) & ": " & Error$
        Stop
    End If End Sub Sub exit_Click ()
    End
End Sub Sub Form_Click ()
```

```
        If prep = 3 Then win_order
End Sub

Sub Form_Load ()

Top = 0
    Left = 0
    Width = Screen.Width
    Height = Screen.Height
    nextchoice = 1
    act_mess = ""
    nmess = 0
    n% = 1

Open "register.txt" For Input As 5

Do Until EOF(5)
        Line Input #5, mess$
        If mess$ <> "" Then
            incoming.SelStartCol = 0
            incoming.SelEndCol = 4
            incoming.Clip = mess$
            For i% = 0 To 3
               incoming.Col = i%
               char_str(n%, i%) = incoming.Text
            Next i%
            choice.AddItem char_str(n%, 0)
            If n% > 0 Then Load rcv(n% + 1)
            n% = n% + 1
        End If
    Loop End Sub Sub Form_MouseDown (Button As Integer, Shift As Integer, X As Single, Y As Single)
    If prep = 0 And Button = 1 And madechoice = 1 Then
        msg(2) = X
        msg(3) = Y
        circle1.Left = X - circle1.Width / 2
        circle1.Top = Y - circle1.Height / 2
        line1.X1 = X
        line1.Y1 = Y
        line1.X2 = X + circle1.Width / 1.5
        line1.Y2 = Y - circle1.Height / 1.5
        circle1.Visible = -1
        line1.Visible = -1
        instruct.Text = "Drag mouse to set speed"
        prep = 1
    End If End Sub Sub Form_MouseMove (Button As Integer, Shift As Integer, X As Single, Y As Single)
    If (prep = 1 Or prep = 2) And Button = 1 Then
        xval! = (X - line1.X1)
```

```
            yval! = (Y - line1.Y1)
            tval! = xval! ^ 2 + yval! ^ 2
            If tval! > 10 Then
                prep = 2
                line1.X2 = X
                line1.Y2 = Y
                msg(4) = xval!
                msg(5) = yval!
            End If
        End If End Sub Sub Form_MouseUp (Button As Integer, Shift As Integer, X As Single, Y As Single)
    If prep = 2 Then
        instruct.Text = "Click here when ready"
    End If End Sub Sub instruct_Click ()
    If prep = 2 Then
        prep = 3
        circle1.Visible = 0
        line1.Visible = 0
        choice.Visible = 0
        instruct.Visible = 0
        row_num% = next_slot()
        mess$ = CStr(1) & Chr(9) & CStr(char_app) & Chr(9)
        For i% = 2 To 8
            mess$ = mess$ & CStr(msg(i%)) & Chr(9)
        Next i%
        mess$ = mess$ & CStr(msg(9)) & Chr(9) & CStr(row_num%)

gstate.SelStartRow = row_num%
        gstate.SelStartCol = 0
        gstate.SelEndRow = row_num%
        gstate.SelEndCol = 12
        gstate.Clip = mess$
        gstate.Row = row_num%
        gstate.Col = 10
        gstate.Text = CStr(0)
        gstate.Col = 0
        gstate.Text = CStr(row_num%)

set_global (10)
        rcv(char_app).LinkExecute mess$
        DoEvents win_order
        Timer1.Enabled = -1
        If row_num% = nextchoice Then nextchoice = nextchoice + 1
    End If
End Sub
```

```
Sub next_char_Click ()
    Height = Screen.Height
    prep = 0
    choice.Visible = -1
    instruct.Text = "Please select character"
    instruct.Visible = -1
End Sub Sub rcv_Change (index As Integer)
    incoming.SelStartCol = 0
    incoming.SelEndCol = 2
    incoming.Clip = rcv(index).Text
    incoming.Col = 0
    row_num% = CInt(incoming.Text)
    Select Case row_num%
    Case Is > 0
        gstate.Row = row_num%
        gstate.Col = 1
        i% = gstate.Text
        If i% = 0 Then Exit Sub
        gstate.SelStartRow = row_num%
        gstate.SelStartCol = 0
        gstate.SelEndRow = row_num%
        gstate.SelEndCol = 12
        gstate.Clip = rcv(index).Text
    Case -1
        incoming.Col = 1
        del_row% = incoming.Text
        Call delete_char(index, del_row%)
        Debug.Print index, del_row%
    Case -2
        incoming.Col = 1
        att_row% = incoming.Text
        incoming.Col = 2
        def_row% = incoming.Text
        Call attack_char(index, att_row%, def_row%)
        Debug.Print index, att_row%, def_row%
    End Select End Sub Sub Timer1_Timer ()

Refresh
    set_global (9)

End Sub
```

```
VERSION 2.00
Begin Form server1
    BorderStyle      =    0    'None
    ClientHeight     =    2280
    ClientLeft       =    1125
    ClientTop        =    4140
    ClientWidth      =    1830
    ControlBox       =    0    'False
    Height           =    2685
    Left             =    1065
    LinkMode         =    1    'Source
    LinkTopic        =    "message"
    ScaleHeight      =    2280
    ScaleWidth       =    1830
    Top              =    3795
    Width            =    1950
    Begin TextBox sent
        FontBold         =    -1    'True
        FontItalic       =    0     'False
        FontName         =    "System"
        FontSize         =    9.75
        FontStrikethru   =    0     'False
        FontUnderline    =    0     'False
        Height           =    375
        Left             =    1800
        TabIndex         =    8
        Text             =    "sent"
        Top              =    1920
        Visible          =    0     'False
        Width            =    495
    End
    Begin TextBox del_box
        FontBold         =    -1    'True
        FontItalic       =    0     'False
        FontName         =    "System"
        FontSize         =    9.75
        FontStrikethru   =    0     'False
        FontUnderline    =    0     'False
        Height           =    1650
        Left             =    4365
        TabIndex         =    7
        Text             =    "Text1"
        Top              =    2520
        Visible          =    0     'False
        Width            =    2310
    End
    Begin Timer Timer1
        Enabled          =    0     'False
        Interval         =    400
        Left             =    1575
        Top              =    2985
    End
    Begin CommandButton e2
        Caption          =    "E2"
        Height           =    375
```

```
        Left            =   1320
        TabIndex        =   6
        Top             =   1920
        Width           =   495
     End
     Begin CommandButton e1
        Caption         =   "E1"
        Height          =   375
        Left            =   840
        TabIndex        =   5
        Top             =   1920
        Width           =   495
     End
     Begin CommandButton register
        Caption         =   "Register"
        Height          =   375
        Left            =   0
        TabIndex        =   4
        Top             =   1920
        Width           =   855
     End
     Begin Grid message
        Cols            =   15
        FixedCols       =   0
        FixedRows       =   0
        Height          =   255
        Left            =   2400
        Rows            =   1
        TabIndex        =   3
        Top             =   2040
        Visible         =   0   'False
        Width           =   1815
     End
     Begin Grid gstate
        Cols            =   15
        FixedCols       =   0
        FixedRows       =   0
        Height          =   1335
        Left            =   2280
        Rows            =   15
        TabIndex        =   2
        Top             =   240
        Width           =   1815
     End
     Begin PictureBox epict
        AutoSize        =   -1  'True
        Height          =   1800
        Index           =   2
        Left            =   5400
        Picture         =   (Bitmap)
        ScaleHeight     =   1770
        ScaleWidth      =   1455
        TabIndex        =   1
        Top             =   2040
        Visible         =   0   'False
```

```
        Width               =    1485
    End
    Begin PictureBox epict
        AutoSize            =    -1  'True
        Height              =    1635
        Index               =    1
        Left                =    4800
        Picture             =    (Bitmap)
        ScaleHeight         =    1605
        ScaleWidth          =    2115
        TabIndex            =    0
        Top                 =    240
        Visible             =    0   'False
        Width               =    2145
    End
End
```

```
Declare Sub SetWindowPos Lib "User" (ByVal hWnd As Integer, ByVal hWndInsertAfte
r As Integer, ByVal X As Integer, ByVal Y As Integer, ByVal cx As Integer, ByVal
 cy As Integer, ByVal wFlags As Integer)
Declare Function sndPlaySound Lib "MMSYSTEM.DLL" (ByVal lpszSoundName$, ByVal wF
lags%) As Integer Dim myrow(10) As Integer, mystate(5, 4) As Integer
Dim gmatrix(10, 15) As Integer
Dim init As Integer, myid As Integer
Dim fwidth As Integer, fheight As Integer, char_type As Integer
Dim lastrow As Integer, lastcol As Integer, lastmess As Integer
Dim form_assgn(30) As Integer, form_taken(5) As Integer, nextform As Integer
Dim fpict() As New f0

Const RAND_ACC = 0
Const STOP_RUN = 1500
Const START_ATTK = 1500
Const MAX_SPEED = 1500
Const MIN_SPEED = 400
Const RED = &HFF&
Const GREEN = &HFF00&
Const SOUND_FILE = "sk2.wav"

Const SND_SYNC = &H0
Const SND_ASYN = &H1
Const SND_NODEFAULT = &H2
Const SND_LOOP = &H8
Const SND_NOSTOP = &H10

Sub delete_char (row_num%)
    gmatrix(row_num%, 1) = 0
    i% = form_assgn(row_num%)
    If i% >= 0 Then
        form_taken(i%) = 0
        fpict(i%).Visible = 0
        fpict(i%).Picture = LoadPicture()
        form_assgn(row_num%) = -1
    End If
End Sub Sub jump (row_num%)
    m% = form_assgn(row_num%)
    fpict(m%).Top = fpict(m%).Top - 300
    fpict(m%).Top = fpict(m%).Top - 600
    fpict(m%).Top = fpict(m%).Top + 300
    fpict(m%).Top = fpict(m%).Top + 600
End Sub Function new_form (row_num%) As Integer
    For i% = 0 To nextform - 1
        If form_taken(i%) = 0 Then
            form_taken(i%) = row_num%
            new_form = i%
            Exit Function
        End If
```

```
        Next i%

ReDim Preserve fpict(nextform)
        fpict(nextform).Tag = CStr(nextform)
        form_taken(nextform) = row_num%
        new_form = nextform
        nextform = nextform + 1

End Function

Sub rec_act (itype%, mine%, his%, result%)
    Debug.Print itype%, mine%, his%, result%
    Select Case itype%
    Case -1
        delete_char (mine%)
    Case -2
        If result% = 0 Then
            jump (mine%)
        Else
            m% = form_assgn(mine%)
            mystate(m%, 2) = his%
        End If
    End Select
End Sub Sub send_act (itype%, mine%, his%)

mess$ = CStr(itype%) & Chr(9) & CStr(mine%) & Chr(9) & CStr(his%)
    sent.Text = mess$
    DoEvents
    Debug.Print mess$
End Sub Sub update_char ()
    Static dist(10) As Integer
    Dim row_num As Integer row_num = myrow(0)
    m% = form_assgn(row_num)
    myrow(1) = char_type
    myrow(6) = 0
    myrow(7) = 0

For i% = 1 To lastrow
        dist(i%) = 10000
        If gmatrix(i%, 1) > 0 And gmatrix(i%, 1) <> char_type Then
            hisx! = gmatrix(i%, 2)
            hisy! = gmatrix(i%, 3)
            myx! = myrow(2)
            myy! = myrow(3)
            dist(i%) = Sqr((hisx! - myx!) ^ 2 + (hisy! - myy!) ^ 2)
        End If
    Next i%

If mystate(m%, 2) > 0 Or myrow(9) > 0 Then
```

```
        If gmatrix(mystate(m%, 2), 1) = 0 Then mystate(m%, 2) = 0
        If gmatrix(myrow(9), 1) = 0 Then myrow(9) = 0
    End If run_dist% = 10000
    run_row% = mystate(m%, 2)
    If run_row% > 0 Then run_dist% = dist(run_row%)
    attacked% = 0
    For i% = 1 To lastrow
        If gmatrix(i%, 1) > 0 And gmatrix(i%, 1) <> char_type Then
            If gmatrix(i%, 9) = row_num Then
                attacked% = 1
                If dist(i%) < run_dist% Then
                    run_dist% = dist(i%)
                    run_row% = i%
                End If
            End If
        End If
    Next i%
    check_att% = mystate(m%, 1) - attacked%
    Select Case check_att%
    Case 1
        fpict(m%).Refresh
    Case -1
        xc! = fpict(m%).Width / 2
        yc! = fpict(m%).Height / 2
        rc! = xc!
        fpict(m%).Circle (xc!, yc!), rc!, GREEN
    End Select
    mystate(m%, 1) = attacked%

If mystate(m%, 2) > 0 Or mystate(m%, 1) > 0 Then
        If run_dist% < STOP_RUN Then
            mystate(m%, 2) = run_row%
            If run_dist% > 1 Then
                myx! = myrow(2)
                myy! = myrow(3)
                hisx! = gmatrix(run_row%, 2)
                hisy! = gmatrix(run_row%, 3)
                myrow(6) = (myx! - hisx!) * (1500# / run_dist%)
                myrow(7) = (myy! - hisy!) * (1500# / run_dist%)
            Else
                myrow(6) = 1000
                myrow(7) = 1000
            End If
        Else
            mystate(m%, 2) = 0
            myrow(9) = 0
        End If
    End If
    attk_row% = 0
    attk_dist! = 10000
    For i% = 1 To lastrow
        If dist(i%) < START_ATTK And gmatrix(i%, 1) <> char_type Then
            If gmatrix(i%, 8) < myrow(8) / 4 Then
```

```
        If mystate(m%, 1) = 0 And myrow(9) = 0 Then
            If dist(i%) < attk_dist! Then
              attk_row% = i%
              attk_dist! = dist(i%)
            End If
        End If
      End If
    End If
Next i%
If attk_row% > 0 Then
    myrow(9) = attk_row%
    wFlags% = SND_SYNC And SND_NODEFAULT
    X% = sndPlaySound(SOUND_FILE, wFlags%)
    DoEvents
    Call send_act(-2, row_num, attk_row%)
End If
vxlast! = myrow(4)
vylast! = myrow(5)
myrow(4) = myrow(4) + myrow(6)
myrow(5) = myrow(5) + myrow(7)
vtot! = Sqr(myrow(4) ^ 2 + myrow(5) ^ 2)
If vtot! > MIN_SPEED Then
    myrow(4) = myrow(4) * .9
    myrow(5) = myrow(5) * .9
End If
If vtot! > MAX_SPEED Then
    myrow(4) = myrow(4) * (MAX_SPEED / vtot!)
    myrow(5) = myrow(5) * (MAX_SPEED / vtot!)
End If
myrow(2) = myrow(2) + (vxlast! + myrow(4)) / 2
myrow(3) = myrow(3) + (vylast! + myrow(5)) / 2

If myrow(2) > fwidth - fpict(m%).Width / 2 And myrow(4) > 0 Then myrow(4) =
myrow(4) * -1
    If myrow(2) < fpict(m%).Width / 2 And myrow(4) < 0 Then myrow(4) = myrow(4)
* -1
    If myrow(3) > fheight - fpict(m%).Height / 2 And myrow(5) > 0 Then myrow(5)
= myrow(5) * -1
    If myrow(3) < fpict(m%).Height / 2 And myrow(5) < 0 Then myrow(5) = myrow(5)
* -1 new_pict% = Int(1 + 2 * Rnd(1))
    xdiff! = epict(new_pict%).Width - epict(mystate(m%, 0)).Width
    ydiff! = epict(new_pict%).Height - epict(mystate(m%, 0)).Height
    myrow(2) = myrow(2) + xdiff! / 2
    myrow(3) = myrow(3) + ydiff! / 2
    mystate(m%, 0) = new_pict%
    myrow(8) = (epict(new_pict%).Width / 100) * (epict(new_pict%).Height / 100)
    myrow(10) = fpict(m%).hWnd For i% = 0 To lastcol
        gmatrix(row_num, i%) = myrow(i%)
    Next i% mess$ = CStr(row_num) & Chr(9) & CStr(char_type) & Chr(9)
```

```
    For i% = 2 To 9
        mess$ = mess$ & CStr(myrow(i%)) & Chr(9)
    Next i%
    mess$ = mess$ & CStr(myrow(10))
    sent.Text = mess$
    DoEvents End Sub Sub del_box_Change ()
    i% = del_box.Text
    If i% > -1 Then
        m% = form_taken(i%)
        Call send_act(-1, m%, 0)
        del_box.Text = "-1"
    End If
End Sub Sub e1_Click ()
    Picture = epict(1).Picture
End Sub Sub e2_Click ()
    Picture = epict(2).Picture
End Sub Sub Form_LinkClose ()
    End
End Sub Sub Form_LinkExecute (Cmdstr As String, Cancel As Integer)
    message.SelStartCol = 0
    message.SelEndCol = 12
    message.Clip = Cmdstr
    message.Col = 0
    messtype% = CInt(message.Text)
    Select Case messtype%
        Case 0
            message.Col = 1
            char_type = CInt(message.Text)
            message.Col = 2
            fwidth = CInt(message.Text)
            message.Col = 3
            fheight = CInt(message.Text)
            Cancel = 0
            init = 2
        Case 1
            message.Col = lastcol + 1
            myid = CInt(message.Text)
            If nextform > 4 Then
              Cancel = 1
              Exit Sub
            End If
            form_assgn(myid) = new_form(myid)
            mystate(form_assgn(myid), 0) = 1
```

```
            myrow(0) = myid
            myrow(1) = char_type
            For j% = 2 To 9
               message.Col = j%
               myrow(j%) = CInt(message.Text)
            Next j%
            m% = form_assgn(myid)
            myrow(3) = myrow(3) + 500
            fpict(m%).Visible = -1
            myrow(10) = fpict(m%).hWnd
            Call SetWindowPos(myrow(10), HWND_TOP, 0, 0, 0, 0, SWP_NOMOVE + SWP_
NOSIZE)

For i% = 0 To lastcol
               gmatrix(myid, i%) = myrow(i%)
            Next i%
            mess$ = CStr(myid) & Chr(9) & CStr(char_type) & Chr(9)
            For i% = 2 To 9
               mess$ = mess$ & CStr(myrow(i%)) & Chr(9)
            Next i%
            mess$ = mess$ & CStr(myrow(10))
            sent.Text = mess$
            DoEvents
            Cancel = 0
            init = 1
            Timer1.Enabled = -1
       End Select
End Sub Sub Form_LinkOpen (Cancel As Integer)
    Visible = 0
End Sub Sub Form_Load ()
    lastcol = 9
    Picture = epict(1).Picture
    Randomize
End Sub Sub register_Click ()
    Open "register.txt" For Input As 5
    present% = 0
    Do Until EOF(5)
        Line Input #5, mess$
        message.SelStartCol = 0
        message.SelEndCol = 5
        message.Clip = mess$
        message.Col = 0
        title$ = message.Text
        message.Col = 1
        appl$ = message.Text
        message.Col = 2
        topic$ = message.Text
        message.Col = 3
        item$ = message.Text
```

```
            Debug.Print title$, appl$, topic$, item$
            If title$ = "elephant" Then present% = 1
        Loop
        Close #5
        Debug.Print title$, present%
        If present% = 0 Then
            title$ = "elephant"
            appl$ = "elephant"
            topic$ = "message"
            item$ = "sent"
            mess$ = title$ & Chr(9) & appl$ & Chr(9)
            mess$ = mess$ & topic$ & Chr(9) & item$ & Chr(13)
            Open "register.txt" For Append As 5
            Print #5, mess$
            Close #5
        End If End Sub Sub Timer1_Timer ()

gstate.SelStartRow = 0
    gstate.SelStartCol = 0
    gstate.SelEndRow = 10
    gstate.SelEndCol = 12
    msg$ = Clipboard.GetText(1)
    gstate.Clip = msg$
    gstate.Row = 0
    gstate.Col = 0
    lastrow = CInt(gstate.Text)
    gstate.Col = 1
    lastmess = CInt(gstate.Text)

For i% = 1 To lastrow
        gstate.Row = i%
        gstate.Col = 1
        ctest% = gstate.Text
        If ctest% <> char_type Then
            For j% = 0 To lastcol
                gstate.Col = j%
                gmatrix(i%, j%) = CInt(gstate.Text)
            Next j%
        End If
    Next i%

For i% = 1 To lastmess
        gstate.Row = gstate.Row + 1
        gstate.Col = 0
        ctype% = gstate.Text
        If ctype% = char_type Then
            gstate.Col = 1
            itype% = gstate.Text
            gstate.Col = 2
            mine% = gstate.Text
            gstate.Col = 3
```

```
            his% = gstate.Text
            gstate.Col = 4
            result% = gstate.Text
            Call rec_act(itype%, mine%, his%, result%)
        End If
    Debug.Print lastmess
    Debug.Print ctype%, itype%, mine%, his%, result%
    Next i%

For i% = 1 To lastrow
        If gmatrix(i%, 1) = char_type Then
            m% = form_assgn(i%)
            myx% = gmatrix(i%, 2)
            myy% = gmatrix(i%, 3)
            pct% = mystate(m%, 0)
            If pct% = 0 Then pct% = 1
            fpict(m%).Picture = epict(pct%).Picture
            myw% = epict(pct%).Width
            myh% = epict(pct%).Height
            myx% = myx% - myw% / 2
            myy% = myy% - myh% / 2
            fpict(m%).Width = myw%
            fpict(m%).Height = myh%
            fpict(m%).Move myx%, myy%
        End If
    Next i%

For i% = 1 To lastrow
        If gmatrix(i%, 1) = char_type Then
            For j% = 0 To lastcol
                myrow(j%) = gmatrix(i%, j%)
            Next j%
            update_char
        End If
    Next i%
End Sub
```

```
VERSION 2.00
Begin Form f0
    BorderStyle     =   0   'None
    Caption         =   "f0"
    ClientHeight    =   4020
    ClientLeft      =   1095
    ClientTop       =   1485
    ClientWidth     =   7365
    ControlBox      =   0   'False
    Height          =   4425
    Left            =   1035
    LinkTopic       =   "Form2"
    ScaleHeight     =   4020
    ScaleWidth      =   7365
    Top             =   1140
    Visible         =   0   'False
    Width           =   7485
End
```

```
Declare Function GetActiveWindow Lib "User" () As Integer
Declare Sub SetWindowPos Lib "User" (ByVal hWnd As Integer, ByVal hWndInsertAfte
r As Integer, ByVal X As Integer, ByVal Y As Integer, ByVal cx As Integer, ByVal
 cy As Integer, ByVal wFlags As Integer)
Declare Function SetFocusAPI Lib "User" Alias "SetFocus" (ByVal hWnd As Integer)
 As Integer Sub Form_Click ()
    server1.del_box.Text = Tag
End Sub
```

```
VERSION 2.00
Begin Form server1
    BorderStyle     =   0       'None
    ClientHeight    =   2280
    ClientLeft      =   1125
    ClientTop       =   4140
    ClientWidth     =   1830
    ControlBox      =   0       'False
    Height          =   2685
    Left            =   1065
    LinkMode        =   1       'Source
    LinkTopic       =   "message"
    ScaleHeight     =   2280
    ScaleWidth      =   1830
    Top             =   3795
    Width           =   1950
    Begin TextBox sent
        FontBold        =   -1      'True
        FontItalic      =   0       'False
        FontName        =   "System"
        FontSize        =   9.75
        FontStrikethru  =   0       'False
        FontUnderline   =   0       'False
        Height          =   375
        Left            =   1800
        TabIndex        =   8
        Text            =   "sent"
        Top             =   1920
        Visible         =   0       'False
        Width           =   495
    End
    Begin TextBox del_box
        FontBold        =   -1      'True
        FontItalic      =   0       'False
        FontName        =   "System"
        FontSize        =   9.75
        FontStrikethru  =   0       'False
        FontUnderline   =   0       'False
        Height          =   1650
        Left            =   4365
        TabIndex        =   7
        Text            =   "Text1"
        Top             =   2520
        Visible         =   0       'False
        Width           =   2310
    End
    Begin Timer Timer1
        Enabled         =   0       'False
        Interval        =   400
        Left            =   1575
        Top             =   2985
    End
    Begin CommandButton e2
        Caption         =   "E2"
        Height          =   375
```

```
        Left             =    1320
        TabIndex         =    6
        Top              =    1920
        Width            =    495
    End
    Begin CommandButton e1
        Caption          =    "E1"
        Height           =    375
        Left             =    840
        TabIndex         =    5
        Top              =    1920
        Width            =    495
    End
    Begin CommandButton register
        Caption          =    "Register"
        Height           =    375
        Left             =    0
        TabIndex         =    4
        Top              =    1920
        Width            =    855
    End
    Begin Grid message
        Cols             =    15
        FixedCols        =    0
        FixedRows        =    0
        Height           =    255
        Left             =    2400
        Rows             =    1
        TabIndex         =    3
        Top              =    2040
        Visible          =    0   'False
        Width            =    1815
    End
    Begin Grid gstate
        Cols             =    15
        FixedCols        =    0
        FixedRows        =    0
        Height           =    1335
        Left             =    2280
        Rows             =    15
        TabIndex         =    2
        Top              =    240
        Width            =    1815
    End
    Begin PictureBox epict
        AutoSize         =    -1  'True
        Height           =    510
        Index            =    2
        Left             =    5400
        Picture          =    (Icon)
          ScaleHeight    =     480
        ScaleWidth       =    480
        TabIndex         =    1
        Top              =    2040
        Visible          =    0   'False
```

```
        Width            =    510
    End
    Begin PictureBox epict
        AutoSize         =    -1    'True
        Height           =    510
        Index            =    1
        Left             =    4800
        Picture          =    (Icon)
        ScaleHeight      =    480
        ScaleWidth       =    480
        TabIndex         =    0
        Top              =    240
        Visible          =    0     'False
        Width            =    510
    End
End
```

```
Declare Sub SetWindowPos Lib "User" (ByVal hWnd As Integer, ByVal hWndInsertAfte
r As Integer, ByVal X As Integer, ByVal Y As Integer, ByVal cx As Integer, ByVal
 cy As Integer, ByVal wFlags As Integer)
Declare Function sndPlaySound Lib "MMSYSTEM.DLL" (ByVal lpszSoundName$, ByVal wF
lags%) As Integer Dim myrow(10) As Integer, mystate(5, 4) As Integer
Dim gmatrix(10, 15) As Integer
Dim init As Integer, myid As Integer
Dim fwidth As Integer, fheight As Integer, char_type As Integer
Dim lastrow As Integer, lastcol As Integer, lastmess As Integer
Dim form_assgn(30) As Integer, form_taken(5) As Integer, nextform As Integer
Dim fpict() As New f0

Const RAND_ACC = 500
Const STOP_RUN = 1500
Const START_ATTK = 1500
Const MAX_SPEED = 1500
Const MIN_SPEED = 400
Const RED = &HFF&
Const GREEN = &HFF00&
Const SOUND_FILE = "f12.wav"

Const SND_SYNC = &H0
Const SND_ASYN = &H1
Const SND_NODEFAULT = &H2
Const SND_LOOP = &H8
Const SND_NOSTOP = &H10

Sub delete_char (row_num%)
    gmatrix(row_num%, 1) = 0
    i% = form_assgn(row_num%)
    If i% >= 0 Then
        form_taken(i%) = 0
        fpict(i%).Visible = 0
        fpict(i%).Picture = LoadPicture()
        form_assgn(row_num%) = -1
    End If
End Sub Sub jump (row_num%)
    m% = form_assgn(row_num%)
    fpict(m%).Top = fpict(m%).Top - 300
    fpict(m%).Top = fpict(m%).Top - 600
    fpict(m%).Top = fpict(m%).Top + 300
    fpict(m%).Top = fpict(m%).Top + 600
End Sub Function new_form (row_num%) As Integer
    For i% = 0 To nextform - 1
        If form_taken(i%) = 0 Then
            form_taken(i%) = row_num%
            new_form = i%
            Exit Function
        End If
```

```
    Next i%

ReDim Preserve fpict(nextform)
    fpict(nextform).Tag = CStr(nextform)
    form_taken(nextform) = row_num%
    new_form = nextform
    nextform = nextform + 1

End Function

Sub rec_act (itype%, mine%, his%, result%)
    Debug.Print itype%, mine%, his%, result%
    Select Case itype%
    Case -1
        delete_char (mine%)
    Case -2
        If result% = 0 Then
            jump (mine%)
        Else
            m% = form_assgn(mine%)
            mystate(m%, 2) = his%
        End If
    End Select
End Sub Sub send_act (itype%, mine%, his%)

mess$ = CStr(itype%) & Chr(9) & CStr(mine%) & Chr(9) & CStr(his%)
    sent.Text = mess$
    DoEvents
    Debug.Print mess$
End Sub Sub update_char ()
    Static dist(10) As Integer
    Dim row_num As Integer row_num = myrow(0)
    m% = form_assgn(row_num)
    myrow(1) = char_type
    myrow(6) = Int(1 + RAND_ACC * Rnd(1)) - RAND_ACC / 2
    myrow(7) = Int(1 + RAND_ACC * Rnd(1)) - RAND_ACC / 2

For i% = 1 To lastrow
        dist(i%) = 10000
        If gmatrix(i%, 1) > 0 And gmatrix(i%, 1) <> char_type Then
            hisx! = gmatrix(i%, 2)
            hisy! = gmatrix(i%, 3)
            myx! = myrow(2)
            myy! = myrow(3)
            dist(i%) = Sqr((hisx! - myx!) ^ 2 + (hisy! - myy!) ^ 2)
        End If
    Next i%

If mystate(m%, 2) > 0 Or myrow(9) > 0 Then
```

```
        If gmatrix(mystate(m%, 2), 1) = 0 Then mystate(m%, 2) = 0
        If gmatrix(myrow(9), 1) = 0 Then myrow(9) = 0
    End If run_dist% = 10000
run_row% = mystate(m%, 2)
If run_row% > 0 Then run_dist% = dist(run_row%)
attacked% = 0
For i% = 1 To lastrow
    If gmatrix(i%, 1) > 0 And gmatrix(i%, 1) <> char_type Then
        If gmatrix(i%, 9) = row_num Then
            attacked% = 1
            If dist(i%) < run_dist% Then
                run_dist% = dist(i%)
                run_row% = i%
            End If
        End If
    End If
Next i%
check_att% = mystate(m%, 1) - attacked%
Select Case check_att%
Case 1
    fpict(m%).Refresh
Case -1
    xc! = fpict(m%).Width / 2
    yc! = fpict(m%).Height / 2
    rc! = xc!
    fpict(m%).Circle (xc!, yc!), rc!, GREEN
End Select
mystate(m%, 1) = attacked%

If mystate(m%, 2) > 0 Or mystate(m%, 1) > 0 Then
    If run_dist% < STOP_RUN Then
        mystate(m%, 2) = run_row%
        If run_dist% > 1 Then
            myx! = myrow(2)
            myy! = myrow(3)
            hisx! = gmatrix(run_row%, 2)
            hisy! = gmatrix(run_row%, 3)
            myrow(6) = (myx! - hisx!) * (1500# / run_dist%)
            myrow(7) = (myy! - hisy!) * (1500# / run_dist%)
        Else
            myrow(6) = 1000
            myrow(7) = 1000
        End If
    Else
        mystate(m%, 2) = 0
        myrow(9) = 0
    End If
End If
attk_row% = 0
attk_dist! = 10000
For i% = 1 To lastrow
    If dist(i%) < START_ATTK And gmatrix(i%, 1) <> char_type Then
        If gmatrix(i%, 8) < myrow(8) / 4 Then
```

```
        If mystate(m%, 1) = 0 And myrow(9) = 0 Then
            If dist(i%) < attk_dist! Then
               attk_row% = i%
               attk_dist! = dist(i%)
            End If
        End If
     End If
   End If
Next i%
If attk_row% > 0 Then
    myrow(9) = attk_row%
    wFlags% = SND_SYNC And SND_NODEFAULT
    X% = sndPlaySound(SOUND_FILE, wFlags%)
    DoEvents
    Call send_act(-2, row_num, attk_row%)
End If
vxlast! = myrow(4)
vylast! = myrow(5)
myrow(4) = myrow(4) + myrow(6)
myrow(5) = myrow(5) + myrow(7)
vtot! = Sqr(myrow(4) ^ 2 + myrow(5) ^ 2)
If vtot! > MIN_SPEED Then
    myrow(4) = myrow(4) * .9
    myrow(5) = myrow(5) * .9
End If
If vtot! > MAX_SPEED Then
    myrow(4) = myrow(4) * (MAX_SPEED / vtot!)
    myrow(5) = myrow(5) * (MAX_SPEED / vtot!)
End If
myrow(2) = myrow(2) + (vxlast! + myrow(4)) / 2
myrow(3) = myrow(3) + (vylast! + myrow(5)) / 2

If myrow(2) > fwidth - fpict(m%).Width / 2 And myrow(4) > 0 Then myrow(4) =
myrow(4) * -1
   If myrow(2) < fpict(m%).Width / 2 And myrow(4) < 0 Then myrow(4) = myrow(4)
* -1
   If myrow(3) > fheight - fpict(m%).Height / 2 And myrow(5) > 0 Then myrow(5)
= myrow(5) * -1
   If myrow(3) < fpict(m%).Height / 2 And myrow(5) < 0 Then myrow(5) = myrow(5)
* -1 new_pict% = Int(1 + 2 * Rnd(1))
   xdiff! = epict(new_pict%).Width - epict(mystate(m%, 0)).Width
   ydiff! = epict(new_pict%).Height - epict(mystate(m%, 0)).Height
   myrow(2) = myrow(2) + xdiff! / 2
   myrow(3) = myrow(3) + ydiff! / 2
   mystate(m%, 0) = new_pict%
   myrow(8) = (epict(new_pict%).Width / 100) * (epict(new_pict%).Height / 100)
   myrow(10) = fpict(m%).hWnd For i% = 0 To lastcol
       gmatrix(row_num, i%) = myrow(i%)
   Next i% mess$ = CStr(row_num) & Chr(9) & CStr(char_type) & Chr(9)
```

```
        For i% = 2 To 9
            mess$ = mess$ & CStr(myrow(i%)) & Chr(9)
        Next i%
        mess$ = mess$ & CStr(myrow(10))
        sent.Text = mess$
        DoEvents End Sub Sub del_box_Change ()
    i% = del_box.Text
    If i% > -1 Then
        m% = form_taken(i%)
        Call send_act(-1, m%, 0)
        del_box.Text = "-1"
    End If
End Sub Sub e1_Click ()
    Picture = epict(1).Picture
End Sub Sub e2_Click ()
    Picture = epict(2).Picture
End Sub Sub Form_LinkClose ()
    End
End Sub Sub Form_LinkExecute (Cmdstr As String, Cancel As Integer)
    message.SelStartCol = 0
    message.SelEndCol = 12
    message.Clip = Cmdstr
    message.Col = 0
    messtype% = CInt(message.Text)
    Select Case messtype%
        Case 0
            message.Col = 1
            char_type = CInt(message.Text)
            message.Col = 2
            fwidth = CInt(message.Text)
            message.Col = 3
            fheight = CInt(message.Text)
            Cancel = 0
            init = 2
        Case 1
            message.Col = lastcol + 1
            myid = CInt(message.Text)
            If nextform > 4 Then
               Cancel = 1
               Exit Sub
            End If
            form_assgn(myid) = new_form(myid)
            mystate(form_assgn(myid), 0) = 1
```

```
            myrow(0) = myid
            myrow(1) = char_type
            For j% = 2 To 9
              message.Col = j%
              myrow(j%) = CInt(message.Text)
            Next j%
            m% = form_assgn(myid)
            myrow(3) = myrow(3) + 500
            fpict(m%).Visible = -1
            myrow(10) = fpict(m%).hWnd
            Call SetWindowPos(myrow(10), HWND_TOP, 0, 0, 0, 0, SWP_NOMOVE + SWP_
NOSIZE)

For i% = 0 To lastcol
               gmatrix(myid, i%) = myrow(i%)
            Next i%
            mess$ = CStr(myid) & Chr(9) & CStr(char_type) & Chr(9)
            For i% = 2 To 9
              mess$ = mess$ & CStr(myrow(i%)) & Chr(9)
            Next i%
            mess$ = mess$ & CStr(myrow(10))
            sent.Text = mess$
            DoEvents
            Cancel = 0
            init = 1
            Timer1.Enabled = -1
       End Select
End Sub Sub Form_LinkOpen (Cancel As Integer)
    Visible = 0
End Sub Sub Form_Load ()
    lastcol = 9
    Picture = epict(1).Picture
    Randomize
End Sub Sub register_Click ()
    Open "register.txt" For Input As 5
    present% = 0
    Do Until EOF(5)
        Line Input #5, mess$
        message.SelStartCol = 0
        message.SelEndCol = 5
        message.Clip = mess$
        message.Col = 0
        title$ = message.Text
        message.Col = 1
        appl$ = message.Text
        message.Col = 2
        topic$ = message.Text
        message.Col = 3
        item$ = message.Text
```

```
            Debug.Print title$, appl$, topic$, item$
            If title$ = "mouse" Then present% = 1
    Loop
    Close #5
    Debug.Print title$, present%
    If present% = 0 Then
        title$ = "mouse"
        appl$ = "mouse1"
        topic$ = "message"
        item$ = "sent"
        mess$ = title$ & Chr(9) & appl$ & Chr(9)
        mess$ = mess$ & topic$ & Chr(9) & item$ & Chr(13)
        Open "register.txt" For Append As 5
        Print #5, mess$
        Close #5
    End If End Sub Sub Timer1_Timer ()

gstate.SelStartRow = 0
    gstate.SelStartCol = 0
    gstate.SelEndRow = 10
    gstate.SelEndCol = 12
    msg$ = Clipboard.GetText(1)
    gstate.Clip = msg$
    gstate.Row = 0
    gstate.Col = 0
    lastrow = CInt(gstate.Text)
    gstate.Col = 1
    lastmess = CInt(gstate.Text)

For i% = 1 To lastrow
        gstate.Row = i%
        gstate.Col = 1
        ctest% = gstate.Text
        If ctest% <> char_type Then
            For j% = 0 To lastcol
                gstate.Col = j%
                gmatrix(i%, j%) = CInt(gstate.Text)
            Next j%
        End If
    Next i%

For i% = 1 To lastmess
        gstate.Row = gstate.Row + 1
        gstate.Col = 0
        ctype% = gstate.Text
        If ctype% = char_type Then
            gstate.Col = 1
            itype% = gstate.Text
            gstate.Col = 2
            mine% = gstate.Text
            gstate.Col = 3
```

```
            his% = gstate.Text
            gstate.Col = 4
            result% = gstate.Text
            Call rec_act(itype%, mine%, his%, result%)
        End If
Debug.Print lastmess
Debug.Print ctype%, itype%, mine%, his%, result%
Next i%

For i% = 1 To lastrow
    If gmatrix(i%, 1) = char_type Then
        m% = form_assgn(i%)
        myx% = gmatrix(i%, 2)
        myy% = gmatrix(i%, 3)
        pct% = mystate(m%, 0)
        If pct% = 0 Then pct% = 1
        fpict(m%).Picture = epict(pct%).Picture
        myw% = epict(pct%).Width
        myh% = epict(pct%).Height
        myx% = myx% - myw% / 2
        myy% = myy% - myh% / 2
        fpict(m%).Width = myw%
        fpict(m%).Height = myh%
        fpict(m%).Move myx%, myy%
    End If
Next i%

For i% = 1 To lastrow
    If gmatrix(i%, 1) = char_type Then
        For j% = 0 To lastcol
            myrow(j%) = gmatrix(i%, j%)
        Next j%
        update_char
    End If
Next i%
End Sub
```

```
VERSION 2.00
Begin Form f0
    BorderStyle     =    0    'None
    Caption         =    "f0"
    ClientHeight    =    4020
    ClientLeft      =    1095
    ClientTop       =    1485
    ClientWidth     =    7365
    ControlBox      =    0    'False
    Height          =    4425
    Left            =    1035
    LinkTopic       =    "Form2"
    ScaleHeight     =    4020
    ScaleWidth      =    7365
    Top             =    1140
    Visible         =    0    'False
    Width           =    7485
End
```

```
Declare Function GetActiveWindow Lib "User" () As Integer
Declare Sub SetWindowPos Lib "User" (ByVal hWnd As Integer, ByVal hWndInsertAfte
r As Integer, ByVal X As Integer, ByVal Y As Integer, ByVal cx As Integer, ByVal
 cy As Integer, ByVal wFlags As Integer)
Declare Function SetFocusAPI Lib "User" Alias "SetFocus" (ByVal hWnd As Integer)
 As Integer Sub Form_Click ()
    server1.del_box.Text = Tag
End Sub
```

What is claimed is:

1. Interactive, electronic game apparatus for playing a game in which game characters appearing on a display are responsive to inputs from a game user, said apparatus comprising:
   a visual display presenting an observable state of said game and of said game characters to said game user in response to a display signal,
   an input device for interactively entering user input signals representative of user interaction with game characters, and
   processing means receiving said user input signals from said input device and generating said display signal and outputting said display signal to said visual display, said processing means including
      an extensible plurality of independent character behavior controllers for determining the behavior of respective said game characters, each said character behavior controller containing independent behavior logic to determine states and state transitions of its respective game character as represented to said user by said display means, said character behavior controllers being responsive to said user input signals and to game control signals for adjusting the behavior of said respective game characters,
      a game controller for coordinating the behavior of said game characters, said game controller containing logic to determine consistent game states for said game and said characters, and communicating said game control signals to said character behavior controllers so that the state of said game and of said game characters is a consistent game state,
      an operating application for operation of said character behavior controllers and said game controller on said processing means,
      each said character behavior controller including an independent dynamically-linked procedure invoked by said operating application,
   said game controller including logic to add new character behavior controllers to said game.

2. The apparatus of claim 1 wherein said game controller receives character state signals from said character behavior controllers, said character state signals describing the observable state of characters controlled by said character behavior controllers.

3. The apparatus of claim 1 wherein said game control signals include a global game state signal, describing the observable states of said characters controlled by said character behavior controllers.

4. The apparatus of claim 3 further comprising plural said global game state signals, and wherein one said global game state signal is accessible to one but not another of said character behavior controllers.

5. The apparatus of claim 1 wherein at least one of said character behavior controllers generates an interaction with a character defined by another said character behavior controller, said interaction requiring resolution to determine subsequent behavior of a character controlled by said character behavior controller, and wherein said game controller determines the resolution of said interaction.

6. The apparatus of claim 1 wherein said game controller includes an instance manager function which directs the creation and deletion of characters controlled by said character behavior controllers.

7. The apparatus of claim 1 wherein said game controller and said character behavior controllers are operated on a single computer.

8. The apparatus of claim 1 wherein said game controller and said character behavior controllers are operated on multiple computers communicating over a network.

9. The apparatus of claim 1 wherein said game controller includes a dynamically-linked procedure invoked by said operating application.

10. Interactive, electronic game apparatus for playing a game with replaceable game controller logic for game characters appearing on a display and responsive to inputs from a game user, said apparatus comprising:
   a visual display presenting an observable state of said game and of said game characters to said game user in response to a display signal,
   an input device for interactively entering user input signals representative of user interaction with game characters, and
   processing means receiving said user input signals from said input device and generating said display signal and outputting said display signal to said visual display, said processing means including
      one or more character behavior controllers for determining the behavior of respective said game characters, each said character behavior controller containing independent behavior logic to determine states and state transitions of its respective game character as represented to said user by said display means, said character behavior controllers being responsive to said user input signals and to game control signals for adjusting the behavior of said respective game characters,
      a game controller for coordinating the behavior of said game characters, said game controller containing logic to determine consistent game states for said game and said characters, and communicating said game control signals to said character behavior controller or controllers so that the state of said game and of said game characters is a consistent game state,
      an operating application for operation of said character behavior controller or controllers and said game controller on said processing means,
      said game controller and each said character behavior controller or controllers including a distinct dynamically-linked procedure invoked by said operating application,
   whereby said game controller can be used with one or more different character behavior controllers, and said one or more character behavior controllers can be used with a different game controller.

11. The apparatus of claim 10 wherein said game controller receives character state signals from one said character behavior controller, said character state signals describing states and state transitions of a character controlled by said character behavior controller.

12. The apparatus of claim 10 wherein at least one of said character behavior controllers generates a character action causing an interaction with another character requiring resolution to determine subsequent behavior of a character controlled by said one character behavior controller, and said interaction is resolved by an interaction manager function provided in said game controller.

13. The apparatus of claim 10 wherein said game controller includes an instance manager function which directs the creation and deletion of characters controlled by said character behavior controller or controllers.

14. A method to coordinate the actions of a plurality of characters appearing on a visual display in an interactive computer or video game, said method comprising:

presenting the observable state of said game and of said game characters to said game user in response to a display signal, providing an input device for interactively entering user input signals representative of user interaction with game characters, receiving said user input signals from said input device and generating said display signal and outputting said display signal to said visual display at a processing means, executing control logic for said characters and said game by an operating application at said processing means, controlling the behavior of said plural characters by character behavior controllers determining states and state transitions for respective characters and each including independent dynamically-linked procedure invoked by said operating application of said processing means, coordinating the behavior of said game characters by a game controller executing as part of said control logic for said game, for said game controller, determining consistent game states for said game and said characters, and communicating game control signals to said character behavior controllers so that the state of said game and of said game characters is a consistent game state, for each said character behavior controller, responding to said user input signals and said game control signals by responsively determining a current state of its respective game character for representation to said user by said display means.

adding a new character to said game by adding a new character behavior controller.

15. The method of claim 14 further comprising communicating character state signals from said character behavior controllers to said game controller, whereby said game controller is informed of states and state transitions of characters controlled by said character behavior controllers.

16. The method of claim 14 further comprising communicating an interaction signal from one said character behavior controller to said game controller, whereby said game controller is required to respond to determine subsequent behavior of a character controlled by said one character behavior controller.

17. The method of claim 14 further comprising communicating creation or deletion signals from said game controller to said character behavior controllers for creating and deleting characters controlled by said character behavior controllers.

18. Electronic display apparatus for multiple independent display characters, said apparatus comprising:

a visual display presenting an observable state of said display characters in response to a display signal, processing means generating said display signal and outputting said display signal to said visual display, said processing means including a plurality of character behavior controllers for determining the behavior of respective said display characters, each said character behavior controller containing independent behavior logic to determine states and state transitions of its respective display character as represented to said user by said display means, said character behavior controller being responsive to display control signals for adjusting the behavior of said respective display characters, a display controller for coordinating the behavior of said display characters, said display controller containing logic to determine consistent display states for said display and said characters, and communicating said display control signals to said character behavior controllers so that the state of said display and of said display characters is a consistent display state, an operating application for operation of said character behavior controllers and said display controller on said processing means, each said character behavior controller including an independent dynamically-linked procedure invoked by said operating application, said display controller including logic to add new character behavior controllers to said visual display.

19. A method for incorporating new characters in an interactive, electronic game with game characters appearing on a display and responsive to inputs from a game user, said method comprising:

presenting the observable state of said game and of said game characters to said game user at a visual display in response to a display signal, providing an input device for interactively entering user input signals representative of user interaction with game characters, receiving said user input signals from said input device and generating said display signal and outputting said display signal to said visual display at a processing means, executing control logic for said characters and said game at said processing means, controlling the behavior of said characters by independent character behavior controllers determining states and state transitions for respective characters and executing as part of said control logic for said characters, coordinating the behavior of said game characters by a game controller executing as part of said control logic for said game, for said game controller, determining consistent game states for said game and said characters and communicating game control signals to said character behavior controllers so that the state of said game and of said game characters is a consistent game state, for said character behavior controllers, responding to said user input signals and to said game control signals by responsively determining a current state for its respective game character as represented to said user by said visual display, and modifying said character control logic at said processing means from a first character behavior control configuration including a first but not a second of two distinct character behavior controllers to a second character behavior control configuration including said second character behavior controller.

20. The method of claim 19 wherein said character logic extension means performs addition of a new logic procedure.

21. The method of claim 19 wherein said character logic extension means performs substitution of procedure logic.

22. The method of claim 19 further comprising communicating a global game state signal, describing the observable states of said characters controlled by said character behavior controllers.

23. The method of claim 19 further comprising communicating character state signals from said character behavior controllers to said game controller, whereby said game controller is informed of states and state transitions of characters controlled by said character behavior controllers.

24. The method of claim 19 further comprising communicating an interaction signal from one said character behavior controller to said game controller, whereby said game controller is required to respond to determine subsequent behavior of a character controlled by said one character behavior controller.

25. The method of claim 19 further comprising communicating creation or deletion signals from said game controller to said character behavior controllers for creating and deleting characters controlled by said character behavior controllers.

26. The method of claim 19 wherein said modifying includes altering character registration information provided at said processing means.

27. The method of claim 19 further comprising executing said game controller and said character behavior controllers on a single computer.

28. The method of claim 19 further comprising executing said game controller and said character behavior controllers on multiple computers communicating over a network.

29. A method for changing game control logic in an interactive, electronic game with game characters appearing on a display and responsive to inputs from a game user, said method comprising:

presenting the observable state of said game and of said game characters to said game user at a visual display in response to a display signal, providing an input device for interactively entering user input signals representative of user interaction with game characters, receiving said user input signals from said input device and generating said display signal and outputting said display signal to said visual display at a processing means, executing control logic for said characters and said game at said processing means, controlling the behavior of said characters by independent character behavior controllers determining states and state transitions for respective characters and executing as part of said control logic for said characters, coordinating the behavior of said game characters by a first or a second of two distinct game controllers executing as part of said control logic for said game, for each said game controller, determining consistent game states for said game and said characters and communicating game control signals to said character behavior controllers so that the state of said game and of said game characters is a consistent game state, for said character behavior controllers, responding to said game control signals for adjusting the behavior of said respective game characters, and modifying said game control logic at said processing means from a first game control configuration including said first game controller to a second game control configuration including said second but not said first game controller.

30. The method of claim 29 further comprising communicating a global game state signal, describing the observable states of said characters controlled by said character behavior controllers.

31. The method of claim 39 further comprising communicating character state signals from said character behavior controllers to said first or second game controller, whereby said game controller is informed of states and state transitions of characters controlled by said character behavior controllers.

32. The method of claim 29 further comprising communicating an interaction signal from one said character behavior controller to said game controller, whereby said game controller is required to respond to determine subsequent behavior of a character controlled by said one character behavior controller.

33. The method of claim 29 further comprising communicating creation or deletion signals from said game controller to said character behavior controllers for creating and deleting characters controlled by said character behavior controllers.

34. The method of claim 29 wherein said modifying includes altering character registration information provided at said processing means.

35. The method of claim 29 further comprising executing said game controllers and said character behavior controllers on a single computer.

36. The method of claim 29 further comprising executing said game controller and said character behavior controllers on multiple computers communicating over a network.

* * * * *

UNITED STATES PATENT AND TRADEMARK OFFICE
CERTIFICATE OF CORRECTION

PATENT NO. : 5,498,003
DATED : March 12, 1996
INVENTOR(S) : Jerry Gechter

It is certified that error appears in the above-indentified patent and that said Letters Patent is hereby corrected as shown below:

In the drawing
On Fig. 7, insert reference no. "713" on the right side

Col. 4, line 39, insert --it-- before "initiates"

Col. 6, line 41 insert --of-- after "state"

Col. 10, line 55, "i" should be --1--

Col. 12, line 63-64, "outcome = 2" should be --outcome % = 2--

Col. 87, line 41 "i" should be --1--

Signed and Sealed this

Twenty-second Day of July, 1997

Attest:

*Attesting Officer*

BRUCE LEHMAN

*Commissioner of Patents and Trademarks*